United States Patent
Withrow et al.

(10) Patent No.: US 12,400,237 B2
(45) Date of Patent: Aug. 26, 2025

(54) PERSONAL HISTORY IN TRACK AND TRACE SYSTEM

(71) Applicant: Alitheon, Inc., Bellevue, WA (US)

(72) Inventors: Justin Lynn Withrow, Bellevue, WA (US); Mark Tocci, Bellevue, WA (US); David Keesu Kim, Bellevue, WA (US); David Justin Ross, Bellevue, WA (US); Scot E. Land, Bellevue, WA (US)

(73) Assignee: Alitheon, Inc., Bellevue, WA (US)

( * ) Notice: Subject to any disclaimer, the term of this patent is extended or adjusted under 35 U.S.C. 154(b) by 0 days.

(21) Appl. No.: 18/322,204

(22) Filed: May 23, 2023

(65) Prior Publication Data
US 2024/0029081 A1     Jan. 25, 2024

Related U.S. Application Data

(60) Continuation of application No. 17/716,281, filed on Apr. 8, 2022, now Pat. No. 11,682,026, which is a
(Continued)

(51) Int. Cl.
*G06V 20/80* (2022.01)
*G06F 16/51* (2019.01)
(Continued)

(52) U.S. Cl.
CPC ......... *G06Q 30/0185* (2013.01); *G06F 16/51* (2019.01); *G06F 16/5838* (2019.01);
(Continued)

(58) Field of Classification Search
CPC ..... G06V 20/80; G06F 18/22; G06Q 30/0185
See application file for complete search history.

(56) References Cited

U.S. PATENT DOCUMENTS

| 4,218,674 A | 8/1980 | Brosow et al. |
| 4,423,415 A | 12/1983 | Goldman |

(Continued)

FOREIGN PATENT DOCUMENTS

| DE | 102006005927 A1 | 8/2007 |
| EP | 0439669 A2 | 8/1991 |

(Continued)

OTHER PUBLICATIONS

Schwabe Williamson & Wyatt, PC—Listing of Related Cases; dated Sep. 16, 2017; 2 pages.
(Continued)

*Primary Examiner* — Edward Park
(74) *Attorney, Agent, or Firm* — Brake Hughes Bellermann LLP

(57) ABSTRACT

Apparatuses and methods associated with personal history in a track and trace system are disclosed herein. In embodiments, a method includes acquiring first information corresponding to a physical object; identifying first authentication data based on the first information; storing the first authentication data in a database system; subsequent to storing the first authentication data, acquiring second information corresponding to a target physical object and identifying second authentication data based on the second information; identifying third information corresponding to the target physical object; querying the database system to seek a matching record based on the second authentication data; in the case that a matching record is returned responsive to the querying, updating the matching record with an indication that the second authentication data was matched to it and updating history data of said matching record based on said third information. Other embodiments may be disclosed or claimed.

20 Claims, 15 Drawing Sheets

Related U.S. Application Data continuation of application No. 17/084,585, filed on Oct. 29, 2020, now Pat. No. 11,301,872, which is a continuation of application No. 16/029,515, filed on Jul. 6, 2018, now Pat. No. 10,861,026, which is a division of application No. 15/436,631, filed on Feb. 17, 2017, now Pat. No. 10,037,537.

(60) Provisional application No. 62/297,262, filed on Feb. 19, 2016, provisional application No. 62/297,334, filed on Feb. 19, 2016, provisional application No. 62/297,285, filed on Feb. 19, 2016, provisional application No. 62/297,343, filed on Feb. 19, 2016.

(51) Int. Cl.

| | | |
|---|---|---|
| *G06F 16/58* | (2019.01) | |
| *G06F 16/583* | (2019.01) | |
| *G06F 16/587* | (2019.01) | |
| *G06F 18/22* | (2023.01) | |
| *G06Q 30/018* | (2023.01) | |
| *G06V 10/44* | (2022.01) | |
| *G06V 10/46* | (2022.01) | |
| *G06V 10/50* | (2022.01) | |
| *G06V 10/75* | (2022.01) | |
| *G06V 20/00* | (2022.01) | |

(52) U.S. Cl.
CPC ........ *G06F 16/5866* (2019.01); *G06F 16/587* (2019.01); *G06F 18/22* (2023.01); *G06V 10/44* (2022.01); *G06V 10/462* (2022.01); *G06V 10/50* (2022.01); *G06V 10/751* (2022.01); *G06V 20/80* (2022.01); *G06F 2221/2111* (2013.01); *G06V 20/95* (2022.01)

(56) References Cited

U.S. PATENT DOCUMENTS

| | | |
|---|---|---|
| 4,677,435 A | 6/1987 | Causse et al. |
| 4,700,400 A | 10/1987 | Ross |
| 4,883,971 A | 11/1989 | Jensen |
| 4,921,107 A | 5/1990 | Hofer |
| 5,031,223 A | 7/1991 | Rosenbaum et al. |
| 5,079,714 A | 1/1992 | Manduley et al. |
| 5,393,939 A | 2/1995 | Nasuta et al. |
| 5,422,821 A | 6/1995 | Allen et al. |
| 5,514,863 A | 5/1996 | Williams |
| 5,518,122 A | 5/1996 | Tilles et al. |
| 5,521,984 A | 5/1996 | Denenberg et al. |
| 5,703,783 A | 12/1997 | Allen et al. |
| 5,719,939 A | 2/1998 | Tel |
| 5,734,568 A | 3/1998 | Borgendale et al. |
| 5,745,590 A | 4/1998 | Pollard |
| 5,883,971 A | 3/1999 | Bolle et al. |
| 5,923,848 A | 7/1999 | Goodhand et al. |
| 5,974,150 A | 10/1999 | Kaish et al. |
| 6,205,261 B1 | 3/2001 | Goldberg |
| 6,246,794 B1 | 6/2001 | Kagehiro et al. |
| 6,292,709 B1 | 9/2001 | Uhl et al. |
| 6,327,373 B1 | 12/2001 | Yura |
| 6,343,327 B2 | 1/2002 | Daniels et al. |
| 6,360,001 B1 | 3/2002 | Berger et al. |
| 6,370,259 B1 | 4/2002 | Hobson et al. |
| 6,400,805 B1 | 6/2002 | Brown et al. |
| 6,421,453 B1 | 7/2002 | Kanevsky et al. |
| 6,424,728 B1 | 7/2002 | Ammar |
| 6,434,601 B1 | 8/2002 | Rollins |
| 6,470,091 B2 | 10/2002 | Koga et al. |
| 6,539,098 B1 | 3/2003 | Baker et al. |
| 6,549,892 B1 | 4/2003 | Sansone |
| 6,597,809 B1 | 7/2003 | Ross et al. |
| 6,643,648 B1 | 11/2003 | Ross et al. |
| 6,697,500 B2 | 2/2004 | Woolston et al. |
| 6,741,724 B1 | 5/2004 | Bruce et al. |
| 6,768,810 B2 | 7/2004 | Emanuelsson et al. |
| 6,778,703 B1 | 8/2004 | Zlotnick |
| 6,805,926 B2 | 10/2004 | Cote et al. |
| 6,816,602 B2 | 11/2004 | Coffelt et al. |
| 6,829,369 B2 | 12/2004 | Poulin et al. |
| 6,937,748 B1 | 8/2005 | Schneider et al. |
| 6,940,391 B1 | 9/2005 | Ishikura et al. |
| 6,961,466 B2 | 11/2005 | Imagawa et al. |
| 6,985,925 B2 | 1/2006 | Ogawa |
| 6,985,926 B1 | 1/2006 | Ferlauto et al. |
| 7,016,532 B2 | 3/2006 | Boncyk et al. |
| 7,031,519 B2 | 4/2006 | Elmenhurst |
| 7,096,152 B1 | 8/2006 | Ong |
| 7,120,302 B1 | 10/2006 | Billester |
| 7,121,458 B2 | 10/2006 | Avant et al. |
| 7,152,047 B1 | 12/2006 | Nagel |
| 7,171,049 B2 | 1/2007 | Snapp |
| 7,204,415 B2 | 4/2007 | Payne et al. |
| 7,212,949 B2 | 5/2007 | Bachrach |
| 7,333,987 B2 | 2/2008 | Ross et al. |
| 7,343,623 B2 | 3/2008 | Ross |
| 7,356,162 B2 | 4/2008 | Caillon |
| 7,379,603 B2 | 5/2008 | Ross et al. |
| 7,436,979 B2 | 10/2008 | Bruce et al. |
| 7,477,780 B2 | 1/2009 | Boncyk et al. |
| 7,518,080 B2 | 4/2009 | Amato |
| 7,602,938 B2 | 10/2009 | Prokoski |
| 7,674,995 B2 | 3/2010 | Desprez et al. |
| 7,676,433 B1 | 3/2010 | Ross et al. |
| 7,680,306 B2 | 3/2010 | Boutant et al. |
| 7,720,256 B2 | 5/2010 | Desprez et al. |
| 7,726,457 B2 | 6/2010 | Maier et al. |
| 7,726,548 B2 | 6/2010 | Delavergne |
| 7,748,029 B2 | 6/2010 | Ross |
| 7,822,263 B1 | 10/2010 | Prokoski |
| 7,834,289 B2 | 11/2010 | Orbke et al. |
| 7,853,792 B2 | 12/2010 | Cowburn |
| 8,022,832 B2 | 9/2011 | Vogt et al. |
| 8,032,927 B2 | 10/2011 | Ross |
| 8,108,309 B2 | 1/2012 | Tan |
| 8,162,125 B1 | 4/2012 | Csulits et al. |
| 8,180,174 B2 | 5/2012 | Di et al. |
| 8,180,667 B1 | 5/2012 | Baluja et al. |
| 8,194,938 B2 | 6/2012 | Wechsler et al. |
| 8,316,418 B2 | 11/2012 | Ross |
| 8,374,020 B2 | 2/2013 | Katti |
| 8,374,399 B1 | 2/2013 | Talwerdi |
| 8,374,920 B2 | 2/2013 | Hedges et al. |
| 8,391,583 B1 | 3/2013 | Mennie et al. |
| 8,428,772 B2 | 4/2013 | Miette et al. |
| 8,437,530 B1 | 5/2013 | Mennie et al. |
| 8,457,354 B1 | 6/2013 | Kolar et al. |
| 8,477,992 B2 | 7/2013 | Paul et al. |
| 8,520,888 B2 | 8/2013 | Spitzig et al. |
| 8,526,743 B1 | 9/2013 | Campbell et al. |
| 8,774,455 B2 | 7/2014 | Elmenhurst et al. |
| 8,856,881 B2 | 10/2014 | Mouleswaran et al. |
| 8,959,029 B2 | 2/2015 | Jones et al. |
| 9,031,329 B1 | 5/2015 | Farid et al. |
| 9,058,543 B2 | 6/2015 | Campbell et al. |
| 9,152,862 B2 | 10/2015 | Ross et al. |
| 9,170,654 B1 | 10/2015 | Boncyk et al. |
| 9,213,845 B1 | 12/2015 | Taraki et al. |
| 9,224,196 B2 | 12/2015 | Duerksen et al. |
| 9,234,843 B2 | 1/2016 | Sopori et al. |
| 9,245,133 B1 | 1/2016 | Durst et al. |
| 9,350,552 B2 | 5/2016 | Elmenhurst et al. |
| 9,350,714 B2 | 5/2016 | Freeman et al. |
| 9,361,507 B1 | 6/2016 | Hoyos et al. |
| 9,361,596 B2 | 6/2016 | Ross et al. |
| 9,424,461 B1 | 8/2016 | Yuan et al. |
| 9,443,298 B2 | 9/2016 | Ross et al. |
| 9,558,463 B2 | 1/2017 | Ross et al. |
| 9,582,714 B2 | 2/2017 | Ross et al. |
| 9,646,206 B2 | 5/2017 | Ross et al. |
| 9,665,800 B1 | 5/2017 | Kuffner |
| 9,741,724 B2 | 8/2017 | Seshadri et al. |
| 10,037,537 B2 | 7/2018 | Withrow et al. |

(56) References Cited

U.S. PATENT DOCUMENTS

| | | |
|---|---|---|
| 10,043,073 B2 | 8/2018 | Ross et al. |
| 10,192,140 B2 | 1/2019 | Ross et al. |
| 10,199,886 B2 | 2/2019 | Li et al. |
| 10,346,852 B2 | 7/2019 | Ross et al. |
| 10,505,726 B1 | 12/2019 | Andon et al. |
| 10,540,664 B2 | 1/2020 | Ross et al. |
| 10,572,883 B2 | 2/2020 | Ross et al. |
| 10,614,302 B2 | 4/2020 | Withrow et al. |
| 10,621,594 B2 | 4/2020 | Land et al. |
| 10,740,767 B2 | 8/2020 | Withrow |
| 10,936,838 B1 | 3/2021 | Wong |
| 11,682,026 B2 * | 6/2023 | Withrow ............... G06F 16/51 382/218 |
| 2001/0010334 A1 | 8/2001 | Park et al. |
| 2001/0054031 A1 | 12/2001 | Lee et al. |
| 2002/0015515 A1 | 2/2002 | Lichtermann et al. |
| 2002/0073049 A1 | 6/2002 | Dutta |
| 2002/0134836 A1 | 9/2002 | Cash et al. |
| 2002/0168090 A1 | 11/2002 | Bruce et al. |
| 2003/0015395 A1 | 1/2003 | Hallowell et al. |
| 2003/0046103 A1 | 3/2003 | Amato et al. |
| 2003/0091724 A1 | 5/2003 | Mizoguchi |
| 2003/0120677 A1 | 6/2003 | Vernon |
| 2003/0138128 A1 | 7/2003 | Rhoads |
| 2003/0179931 A1 | 9/2003 | Sun |
| 2003/0182018 A1 | 9/2003 | Snapp |
| 2003/0208298 A1 | 11/2003 | Edmonds |
| 2003/0219145 A1 | 11/2003 | Smith |
| 2004/0027630 A1 | 2/2004 | Lizotte |
| 2004/0101174 A1 | 5/2004 | Sato et al. |
| 2004/0112962 A1 | 6/2004 | Farrall et al. |
| 2004/0218791 A1 | 11/2004 | Jiang et al. |
| 2004/0218801 A1 | 11/2004 | Houle et al. |
| 2004/0250085 A1 | 12/2004 | Tattan et al. |
| 2005/0007776 A1 | 1/2005 | Monk et al. |
| 2005/0038756 A1 | 2/2005 | Nagel |
| 2005/0065719 A1 | 3/2005 | Khan et al. |
| 2005/0086256 A1 | 4/2005 | Owens et al. |
| 2005/0111618 A1 | 5/2005 | Sommer et al. |
| 2005/0119786 A1 | 6/2005 | Kadaba |
| 2005/0125360 A1 | 6/2005 | Tidwell et al. |
| 2005/0131576 A1 | 6/2005 | De et al. |
| 2005/0137882 A1 | 6/2005 | Cameron et al. |
| 2005/0160271 A9 | 7/2005 | Brundage et al. |
| 2005/0169529 A1 | 8/2005 | Owechko et al. |
| 2005/0188213 A1 | 8/2005 | Xu |
| 2005/0204144 A1 | 9/2005 | Mizutani |
| 2005/0251285 A1 | 11/2005 | Boyce et al. |
| 2005/0257064 A1 | 11/2005 | Boutant et al. |
| 2005/0289061 A1 | 12/2005 | Kulakowski et al. |
| 2006/0010503 A1 | 1/2006 | Inoue et al. |
| 2006/0043169 A1 | 3/2006 | Haertel |
| 2006/0083414 A1 | 4/2006 | Neumann et al. |
| 2006/0109520 A1 | 5/2006 | Gossaye et al. |
| 2006/0131518 A1 | 6/2006 | Ross et al. |
| 2006/0165261 A1 | 7/2006 | Pira |
| 2006/0177104 A1 | 8/2006 | Prokoski |
| 2006/0253406 A1 | 11/2006 | Caillon |
| 2007/0036470 A1 | 2/2007 | Piersol et al. |
| 2007/0056041 A1 | 3/2007 | Goodman |
| 2007/0071291 A1 | 3/2007 | Yumoto et al. |
| 2007/0085710 A1 | 4/2007 | Bousquet et al. |
| 2007/0094155 A1 | 4/2007 | Dearing |
| 2007/0211651 A1 | 9/2007 | Ahmed et al. |
| 2007/0211964 A1 | 9/2007 | Agam et al. |
| 2007/0223791 A1 | 9/2007 | Shinzaki |
| 2007/0230656 A1 | 10/2007 | Lowes et al. |
| 2007/0263267 A1 | 11/2007 | Ditt |
| 2007/0269043 A1 | 11/2007 | Launay et al. |
| 2007/0282900 A1 | 12/2007 | Owens et al. |
| 2008/0005578 A1 | 1/2008 | Shafir |
| 2008/0008377 A1 | 1/2008 | Andel et al. |
| 2008/0011841 A1 | 1/2008 | Self et al. |
| 2008/0013804 A1 | 1/2008 | Moon et al. |
| 2008/0016355 A1 | 1/2008 | Beun et al. |
| 2008/0128496 A1 | 6/2008 | Bertranou et al. |
| 2008/0130947 A1 | 6/2008 | Ross et al. |
| 2008/0219503 A1 | 9/2008 | Di et al. |
| 2008/0250483 A1 | 10/2008 | Lee |
| 2008/0255758 A1 | 10/2008 | Graham et al. |
| 2008/0272585 A1 | 11/2008 | Conard et al. |
| 2008/0290005 A1 | 11/2008 | Bennett et al. |
| 2008/0294474 A1 | 11/2008 | Furka |
| 2009/0028379 A1 | 1/2009 | Belanger et al. |
| 2009/0057207 A1 | 3/2009 | Orbke et al. |
| 2009/0106042 A1 | 4/2009 | Maytal et al. |
| 2009/0134222 A1 | 5/2009 | Ikeda |
| 2009/0154778 A1 | 6/2009 | Lei et al. |
| 2009/0157733 A1 | 6/2009 | Kim et al. |
| 2009/0223099 A1 | 9/2009 | Versteeg |
| 2009/0232361 A1 | 9/2009 | Miller |
| 2009/0245652 A1 | 10/2009 | Bastos |
| 2009/0271029 A1 | 10/2009 | Doutre |
| 2009/0283583 A1 | 11/2009 | Cowburn et al. |
| 2009/0287498 A2 | 11/2009 | Choi |
| 2009/0307005 A1 | 12/2009 | Omartin et al. |
| 2010/0027834 A1 | 2/2010 | Spitzig et al. |
| 2010/0054551 A1 | 3/2010 | Decoux |
| 2010/0070527 A1 | 3/2010 | Chen |
| 2010/0104200 A1 | 4/2010 | Baras et al. |
| 2010/0157064 A1 | 6/2010 | Cheng et al. |
| 2010/0163612 A1 | 7/2010 | Caillon |
| 2010/0166303 A1 | 7/2010 | Rahimi |
| 2010/0174406 A1 | 7/2010 | Miette et al. |
| 2010/0286815 A1 | 11/2010 | Zimmermann |
| 2011/0026831 A1 | 2/2011 | Perronnin et al. |
| 2011/0049235 A1 | 3/2011 | Gerigk et al. |
| 2011/0064279 A1 | 3/2011 | Uno |
| 2011/0081043 A1 | 4/2011 | Sabol et al. |
| 2011/0091068 A1 | 4/2011 | Stuck et al. |
| 2011/0161117 A1 | 6/2011 | Busque et al. |
| 2011/0188709 A1 | 8/2011 | Gupta et al. |
| 2011/0194780 A1 | 8/2011 | Li et al. |
| 2011/0235920 A1 | 9/2011 | Iwamoto et al. |
| 2011/0267192 A1 | 11/2011 | Goldman et al. |
| 2012/0011119 A1 | 1/2012 | Baheti et al. |
| 2012/0042171 A1 | 2/2012 | White et al. |
| 2012/0089639 A1 | 4/2012 | Wang |
| 2012/0130868 A1 | 5/2012 | Loeken |
| 2012/0177281 A1 | 7/2012 | Frew |
| 2012/0185393 A1 | 7/2012 | Atsmon et al. |
| 2012/0199651 A1 | 8/2012 | Glazer |
| 2012/0242481 A1 | 9/2012 | Gernandt et al. |
| 2012/0243797 A1 | 9/2012 | Di Venuto Dayer et al. |
| 2012/0250945 A1 | 10/2012 | Peng et al. |
| 2013/0110719 A1 | 5/2013 | Carter et al. |
| 2013/0162394 A1 | 6/2013 | Etchegoyen |
| 2013/0212027 A1 | 8/2013 | Sharma et al. |
| 2013/0214164 A1 | 8/2013 | Zhang et al. |
| 2013/0273968 A1 | 10/2013 | Rhoads et al. |
| 2013/0277425 A1 | 10/2013 | Sharma et al. |
| 2013/0284803 A1 | 10/2013 | Wood et al. |
| 2014/0032322 A1 | 1/2014 | Schwieger et al. |
| 2014/0140570 A1 | 5/2014 | Ross et al. |
| 2014/0140571 A1 | 5/2014 | Elmenhurst et al. |
| 2014/0184843 A1 | 7/2014 | Campbell et al. |
| 2014/0201094 A1 | 7/2014 | Herrington et al. |
| 2014/0243232 A1 | 8/2014 | Meredith et al. |
| 2014/0270341 A1 | 9/2014 | Elmenhurst et al. |
| 2014/0314283 A1 | 10/2014 | Harding |
| 2014/0355890 A1 | 12/2014 | Highley |
| 2014/0380446 A1 | 12/2014 | Niu et al. |
| 2015/0043023 A1 | 2/2015 | Ito |
| 2015/0058142 A1 | 2/2015 | Lenahan et al. |
| 2015/0067346 A1 * | 3/2015 | Ross ............... G06F 16/2468 713/176 |
| 2015/0078629 A1 | 3/2015 | Gottemukkula et al. |
| 2015/0086068 A1 | 3/2015 | Mulhearn et al. |
| 2015/0110364 A1 | 4/2015 | Niinuma et al. |
| 2015/0117701 A1 | 4/2015 | Ross et al. |
| 2015/0127430 A1 | 5/2015 | Hammer |
| 2015/0248587 A1 | 9/2015 | Oami et al. |
| 2015/0294189 A1 | 10/2015 | Benhimane et al. |
| 2015/0309502 A1 | 10/2015 | Breitgand et al. |

(56) References Cited

U.S. PATENT DOCUMENTS

| | | |
|---|---|---|
| 2015/0347815 A1 | 12/2015 | Dante et al. |
| 2015/0371087 A1 | 12/2015 | Ross et al. |
| 2016/0034913 A1 | 2/2016 | Zavarehi et al. |
| 2016/0034914 A1 | 2/2016 | Gonen et al. |
| 2016/0055651 A1 | 2/2016 | Oami |
| 2016/0057138 A1 | 2/2016 | Hoyos et al. |
| 2016/0072626 A1 | 3/2016 | Kouladjie |
| 2016/0117631 A1 | 4/2016 | McCloskey et al. |
| 2016/0162734 A1 | 6/2016 | Ross et al. |
| 2016/0180485 A1 | 6/2016 | Avila et al. |
| 2016/0180546 A1 | 6/2016 | Kim et al. |
| 2016/0189510 A1 | 6/2016 | Hutz |
| 2016/0203387 A1 | 7/2016 | Lee et al. |
| 2016/0300234 A1 | 10/2016 | Moss-Pultz et al. |
| 2016/0335520 A1 | 11/2016 | Ross et al. |
| 2017/0004444 A1 | 1/2017 | Krasko et al. |
| 2017/0032285 A1 | 2/2017 | Sharma et al. |
| 2017/0076132 A1 | 3/2017 | Sezan et al. |
| 2017/0132458 A1 | 5/2017 | Short et al. |
| 2017/0153069 A1 | 6/2017 | Huang et al. |
| 2017/0220901 A1 | 8/2017 | Klimovski et al. |
| 2017/0243230 A1 | 8/2017 | Ross et al. |
| 2017/0243231 A1 | 8/2017 | Withrow et al. |
| 2017/0243232 A1 | 8/2017 | Ross et al. |
| 2017/0243233 A1 | 8/2017 | Land et al. |
| 2017/0249491 A1 | 8/2017 | MacIntosh et al. |
| 2017/0251143 A1 | 8/2017 | Peruch et al. |
| 2017/0253069 A1 | 9/2017 | Kerkar et al. |
| 2017/0295301 A1 | 10/2017 | Liu et al. |
| 2017/0300905 A1 | 10/2017 | Withrow et al. |
| 2017/0344823 A1 | 11/2017 | Withrow et al. |
| 2017/0344824 A1 | 11/2017 | Martin |
| 2017/0372327 A1 | 12/2017 | Withrow |
| 2018/0000359 A1 | 1/2018 | Watanabe |
| 2018/0012008 A1 | 1/2018 | Withrow et al. |
| 2018/0018627 A1 | 1/2018 | Ross et al. |
| 2018/0018838 A1 | 1/2018 | Fankhauser et al. |
| 2018/0024074 A1 | 1/2018 | Ranieri et al. |
| 2018/0024178 A1 | 1/2018 | House et al. |
| 2018/0039818 A1 | 2/2018 | Kim et al. |
| 2018/0047128 A1 | 2/2018 | Ross et al. |
| 2018/0053312 A1 | 2/2018 | Ross et al. |
| 2018/0121643 A1 | 5/2018 | Talwerdi et al. |
| 2018/0129861 A1 | 5/2018 | Kim et al. |
| 2018/0144211 A1 | 5/2018 | Ross et al. |
| 2018/0174586 A1 | 6/2018 | Zamora Esquivel et al. |
| 2018/0218505 A1 | 8/2018 | Kim et al. |
| 2018/0293370 A1 | 10/2018 | Kim et al. |
| 2018/0315058 A1 | 11/2018 | Withrow et al. |
| 2018/0341766 A1 | 11/2018 | Anagnostopoulos |
| 2018/0349694 A1 | 12/2018 | Ross et al. |
| 2019/0026581 A1 | 1/2019 | Leizerson |
| 2019/0034518 A1 | 1/2019 | Liu et al. |
| 2019/0034694 A1 | 1/2019 | Ross |
| 2019/0102873 A1 | 4/2019 | Wang et al. |
| 2019/0102973 A1 | 4/2019 | Oyama et al. |
| 2019/0130082 A1 | 5/2019 | Alameh et al. |
| 2019/0228174 A1 | 7/2019 | Withrow et al. |
| 2019/0266373 A1 | 8/2019 | Hirokawa |
| 2019/0279017 A1 | 9/2019 | Graham et al. |
| 2019/0287118 A1 | 9/2019 | Ross et al. |
| 2019/0342102 A1 | 11/2019 | Hao et al. |
| 2019/0354822 A1 | 11/2019 | Pic et al. |
| 2019/0362186 A1 | 11/2019 | Irshad et al. |
| 2020/0153822 A1 | 5/2020 | Land et al. |
| 2020/0226366 A1 | 7/2020 | Withrow et al. |
| 2020/0233901 A1 | 7/2020 | Crowley et al. |
| 2020/0250395 A1 | 8/2020 | Ross et al. |
| 2020/0257791 A1 | 8/2020 | Shannon et al. |
| 2020/0334689 A1 | 10/2020 | Withrow |
| 2020/0349379 A1 | 11/2020 | Ross |
| 2020/0356751 A1 | 11/2020 | Matsuda et al. |
| 2020/0356772 A1 | 11/2020 | Withrow et al. |
| 2021/0375291 A1 | 12/2021 | Zeng et al. |

FOREIGN PATENT DOCUMENTS

| | | |
|---|---|---|
| EP | 0759596 A2 | 2/1997 |
| EP | 1016548 A2 | 7/2000 |
| EP | 1016549 A1 | 7/2000 |
| EP | 1719070 B1 | 4/2009 |
| EP | 2107506 A1 | 10/2009 |
| EP | 2166493 A1 | 3/2010 |
| EP | 2195621 B1 | 11/2013 |
| EP | 2866193 A1 | 4/2015 |
| EP | 2257909 B1 | 5/2015 |
| EP | 2869240 A2 | 5/2015 |
| EP | 2869241 A2 | 5/2015 |
| EP | 3208744 A1 | 8/2017 |
| EP | 3249581 A1 | 11/2017 |
| EP | 3267384 A1 | 1/2018 |
| EP | 3270342 A1 | 1/2018 |
| EP | 3435287 A2 | 1/2019 |
| EP | 3514715 A1 | 7/2019 |
| ES | 2467465 A2 | 6/2014 |
| GB | 2097979 A | 11/1982 |
| GB | 2446837 A | 8/2008 |
| GB | 2482127 A | 1/2012 |
| JP | 61234481 | 10/1986 |
| JP | H07192112 A | 7/1995 |
| JP | 2005321935 A | 11/2005 |
| JP | 2007213148 A | 8/2007 |
| JP | 2008021082 A | 1/2008 |
| JP | 2010146158 A | 7/2010 |
| JP | 5278978 B2 | 5/2013 |
| KR | 20010016395 A | 3/2001 |
| KR | 20120009654 A | 2/2012 |
| WO | 2005086616 A2 | 9/2005 |
| WO | 2006038114 A1 | 4/2006 |
| WO | 2007028799 A1 | 3/2007 |
| WO | 2007031176 A1 | 3/2007 |
| WO | 2007071788 A1 | 6/2007 |
| WO | 2007090437 A1 | 8/2007 |
| WO | 2007144598 A1 | 12/2007 |
| WO | 2009030853 A1 | 3/2009 |
| WO | 2009089126 A1 | 7/2009 |
| WO | 2009115611 A2 | 9/2009 |
| WO | 2010018464 A2 | 2/2010 |
| WO | 2010018646 A1 | 2/2010 |
| WO | 2012145842 A1 | 11/2012 |
| WO | 2013051019 A1 | 4/2013 |
| WO | 2013126221 A1 | 8/2013 |
| WO | 2013173408 A1 | 11/2013 |
| WO | 2015004434 A1 | 1/2015 |
| WO | 2016081755 A1 | 5/2016 |
| WO | 2016081831 A1 | 5/2016 |

OTHER PUBLICATIONS

Scott, Von Duhn, et al., "Three-View Surveillance Video Based Face Modeling for Recognition", Biometrics Symposium, 2007, IEEE, PI, Sep. 30, 2007, 6 pages XP031202430.

Sharma et al., "The Fake vs Real Goods Problem: Microscopy and Machine Learning to the Rescue," KDD 2017 Applied Data Science Paper, Aug. 13-17, 2017, Halifax, NS, Canada, 9 pages.

Shi et al., "Smart Cameras: Fundamentals and Classification," Chapter 2, Belbachir (ed.), Smart Cameras, Springer, New York, New York, USA 2010, pp. 19-34.

Shields, "How to Shop Savvy With Red Laser," published online on Mar. 22, 2010; https ://i phone.appstomn.net/reviews/lifestyle/how-to-shop-savvy-with-redlaser/, downloaded Mar. 22, 2010, 8 pages).

Smith, "Fireball: A Forensic Ballistic Imaging System: Proceedings of the 31st Annual International Carnahan Conference on Security Technology," Canberra, Australia, Oct. 15-17, 1997, pp. 64-70.

Takahashi et al., "Mass-produced Parts Traceability System Based on Automated Scanning of Fingerprint of Things," 15th IAPR International Conference on Machine Vision Applications, Nagoya, Japan, May 8-12, 2017, 5 pages.

Truong, Hieu C, et al., "Royal Canadian Mint/Signoptic Technologies Coin DNA Technology", World Money Fair (WMF) Berlin Feb. 1-3, 2011, http://www.amisdeleuro.org/upload/1340734488. pptx, 22 pages.

(56) References Cited

OTHER PUBLICATIONS

United States Postal Service Publication 28 "Postal Addressing Standards", dated Jul. 2008; text plus Appendix A only; 55 pages.
United States Postal Service, "NCOALink Systems", http://www.usps.com/ncsc/addressservices/moveupdate/cllangeaddress.lltm, website accessed Jun. 23, 2010, 2 pages.
United States Postal Services, NCOALink® Systems, dated May 27, 2009, URL=http://ribbs.usps.gov/ncoalink/ncoalink_print.htm, download date Jun. 23, 2010, 3 pages.
Veena et al., "Automatic Theft Security System (Smart Surveillance Camera)," Computer Science & Information Technology 3:75-87, 2013.
Woods, "Counterfeit-spotting truth machine launches out of Dumbo," published online on Feb. 11, 2016, downloaded from llttp://technically/brooklyn/2016/02/11/entrupy-counterfeit-scanner/ on Mar. 20, 2019, 3 pages.
Yuetian Xu et al.: "Robust object recognition using a cascade of geometric consistency filters", Applied Imagery Pattern Recognition Workshop (AIPRVV), 2009 IEEE, IEEE, Piscataway, NJ, USA, Oct. 14, 2009, pp. 1-8, XP031677352.
Zaeri, Naser, "Minutiae-based Fingerprint Extraction and Recognition, 2020 (year 2010)", 47 pages.
"Intrinsic: Characteristics for Authentication: AlpVision Advances Security Through Digital Technology", Authentication News, Sep. 2006, vol. 12, No. 9, 3 pages.
Banafshe Arbab-Zavar et al., "On guided model-based analysis for ear biometrics", Computer Vision and Image Understanding, Academic Press, US, vol. 115, No. 4, Nov. 24, 2010, pp. 487-502, XP028153838.
Cavoukian et al. "Biometric Encryption: Technology for Strong Authentication, Security and Privacy," 2008, WE, Intl. Fed. Iot Info Processing, vol. 261; Policies and Research in Identity Management; pp. 57-77.
Communication pursuant to Article 94(3) EPC, dated Nov. 5, 2020, EP Application No. 19153141.7, 4 pages.
Communication Pursuant to Rule 164(1) EPC, mailed Feb. 2, 2022, for European Application No. 17166901.3, 5pages.
Ebay, "eBay Launches Must-Have iPhone App RedLaser 3.0" https:/www.ebayinc.com/stories/news/ebay-launches-musthave-iphon-app-redlaser30/, Nov. 18, 2011 (Year: 2011), 8 pages.
European Office Action, dated Nov. 12, 2020, for corresponding European Application No. 17173150.8, 43 pages.
European Search Report dated Mar. 15, 2021, for corresponding EP Application No. 20202445.1, 8 pages.
European Search Report, dated Feb. 25, 2021, for European Application No. 20202130.9, 9 pages.
Extended European Search Report Application No. 21153877.2, Dated: Jun. 15, 2021, 8 pages.
Extended European search report for European Application No. 21166869.4, dated Feb. 7, 2022, 9 pages.
Extended European Search Report, dated Aug. 18, 2021, for European Application No. 21164207.9—17 pages.
Extended European Search Report, dated Aug. 19, 2021, for European Application No. 21164353.1, 9 pages.
Extended European Search Report, dated Jan. 3, 2018, for European Application No. 17186959.7, 11 pages.
Extended European Search Report, dated Jun. 18, 2021, for European Application No. 21153355.9, 8 pages.
Extended European Search Report, dated Nov. 10, 2021, for European Application No. 21179491.2-1207, 8 pages.
Extended European Search Report, dated Oct. 25, 2021, for European Application No. 21176644.9-1207, 11 pages.
Extended European Search Report, dated Oct. 26, 2017, for European Application No. 17179894.5-1871, 8 pages.
Farid, "Digital Image Forensics," Lecture notes, exercises and matlab code, CS 89/189, Dartmouth College, Hanover, New Hampshire, USA, 2013, 199 pages.
Farid, Ahmed, et al., "Integrated fingerprint verification method using a composite signature-based watermarking technique", Optical Engineering, The Catholic University of America, (Year: 2007), 6 pages.
Final Office Action Issued in U.S. Appl. No. 16/917,355, Mailed Oct. 1, 2021, 13 pages.
Fischler et al., "Random Sample Consensus: A Paradigm for Model Fitting with Applications to Image Analysis and Automated Cartography," Communication of the ACM 24(6); 381-395, 1981.
Hensler, J., et al., "Hybrid Face Recognition Based on Real-time Multi-camera Stereo-Matching", ICIAP: International Conference on Image Analysis and Processing, 17th International Conference, Naples, Italy, Sep. 9-13, 2013, 10 pages.
Huang et al., "A Novel Binarization Algorithm for Ballistic Imaging Systems," 3rd International Congress on Image and Signal Processing, Yantai, China, Oct. 16-18, 2010, pp. 1287-1291.
Huang, et al., "An Online Ballistics imaging System for Firearm identification"; 2nd International Conference on Signal Processing Systems, Dalian, China, Jul. 5-7, 2010, vol. 2, pp. 68-72.
Jain, Anil K, et al., "Biometric Cryptosystems: Issues and Challenges", Proceedings of the IEEE, IEEE, New York, US, vol. 92, No. 6, Jun. 1, 2004, XP011112757, pp. 948-960.
Kartik et al., "Security System with Face Recognition, SMS Alert and Embedded Network Video Monitoring Terminal," International Journal of Security, Privacy and Trust Management 2(5):9-19, 2013.
Li, "Firearm Identification System Based on Ballistics Image Processing," Congress on Image and Signal Processing, School of Computer and Information Science, Faculty of Computing, Health and Science Edith Cowan University, Perth, Australia pp. 149-154.
Li, "Image Processing for the Positive Identification of Forensic Ballistics Specimens," Proceedings of the 6th International Conference of Information Fusion, Cairns, Australia, Jul. 8-11, 2003, pp. 1494-1498.
Maddern et al., "Illumination Invariant Imaging: Applications in Robust Vision-based Localization, Mapping and Classification for Autonomous Vehicles," IEEE International Conference on Robotics and Automation, Hong Kong, May 31-Jun. 7, 2014, 8 pages.
Matsumoto et al., "Nano-artifact metrics based on random collapse of resist," Scientific Reports 4:6142, 2014 (5 pages).
Mistry et al., "Comparison of Feature Detection and Matching Approaches: SIFT and SURF," Global Research and Development Journal for Engineering, vol. 2, Issue 4, Mar. 2017, 8 pages.
NCOA Link at http://ribbs.usps.gov/ncoalink/ncoalink print.htm; dated May 27, 2009; 3 pages.
Non-Final Office Action issued in U.S. Appl. No. 16/1866,468, Mailed Sep. 9, 2021, 24 pages.
Non-Final Office Action Issued in U.S. Appl. No. 16/553,943, Mailed Sep. 1, 2021, 13 pages.
Non-Final Office Action Issued in U.S. Appl. No. 16/752,593 Mailed Dec. 3, 2021, 55 pages.
Non-Final Office Action Issued in U.S. Appl. No. 16/783,126, Mailed Oct. 28, 2021, 29 pages.
Non-Final Office Action Issued in U.S. Appl. No. 16/825,270 Mailed Jan. 20, 2022, 29 pages.
Non-Final Office Action Issued in U.S. Appl. No. 16/827,701, Mailed Aug. 17, 2021, 19 pages.
Non-Final Office Action issued in U.S. Appl. No. 16/867,506, Mailed Nov. 8, 2021, 2021, 14 pages.
Non-Final Office Action Issued in U.S. Appl. No. 16/872,202, Mailed Sep. 24, 2021, 14 pages.
Non-Final Office Action Issued in U.S. Appl. No. 16/903,323 Mailed Jan. 25, 2022, 13 pages.
Non-Final Office Action Issued in U.S. Appl. No. 16/917,355, Mailed May 18, 2021, 26 pages.
Notice of Allowance for U.S. Appl. No. 17/189,470, mailed Mar. 11, 2022, 30 pages.
Notice of Allowance for U.S. Appl. No. 17/209,469, mailed Jan. 25, 2022, 12 pages.
Notice of Allowance mailed Oct. 14, 2021, for Ritchey, "Object Change Detection and Measurement Using Digital Fingerprints," U.S. Appl. No. 17/189,470, 12 pages.

(56) References Cited

OTHER PUBLICATIONS

Notice of Allowance mailed Oct. 7, 2021, for Ritchey, "Automated Authentication Region Localization and Capture," U.S. Appl. No. 16/866,468, 9 pages.

Online NCOALink® Processing Acknowledgement Form (PAF) Released by Lorton Data, Jun. 2, 2009, URL=http://us.generation-nt.com/online-ncoalink-processingacknowledgement-form-pdf-released-by-press-1567191.html, download date Jun. 25, 2010, 2 pages.

Rublee et al., "ORB: an efficient alternative to SIFT or SURF," IEEE International Conference on Computer Vision, Barcelona, Spain, Nov. 6-13, 2011, 8 pages.

Schneider et al., "A Robust Content Based Digital Signature for Image Authentication," Proceeding of the International Conference on Image Processing Lausanne; Switzerland, Sep. 19, 1996, pp. 227-230.

* cited by examiner

FIG. 6 Sample Authentication Regions

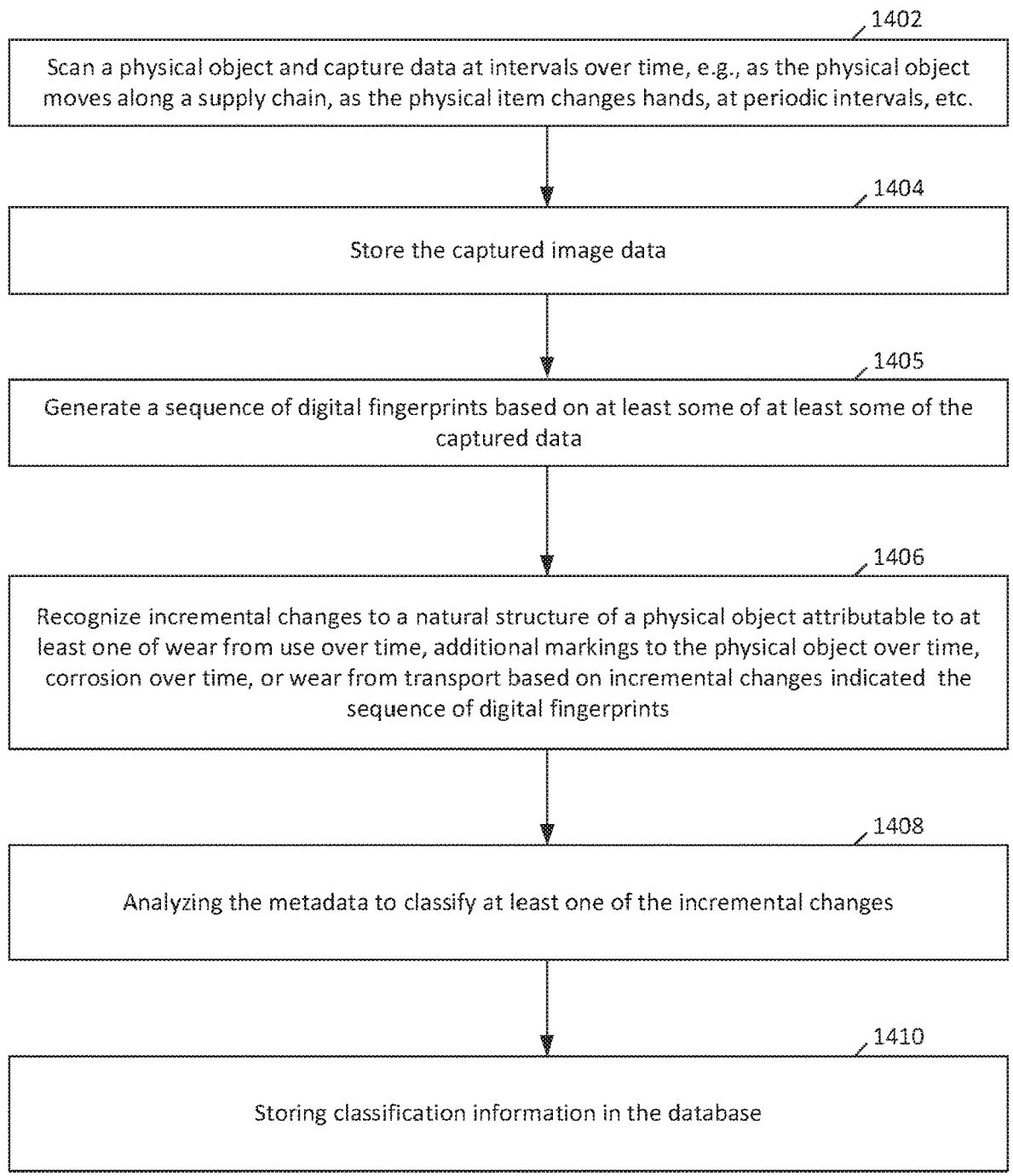

PERSONAL HISTORY IN TRACK AND TRACE SYSTEM

RELATED APPLICATIONS

This application is a continuation of, and claims priority to, U.S. patent application Ser. No. 17/716,281, filed on Apr. 8, 2022, entitled "PERSONAL HISTORY IN TRACK AND TRACE SYSTEM," which is a continuation of U.S. patent application Ser. No. 17/084,545, filed on Oct. 29, 2020, now issued as U.S. Pat. No. 11,301,872, which is a continuation of U.S. patent application Ser. No. 16/029,515, filed on Jul. 6, 2018, now issued as U.S. Pat. No. 10,861,026, which is a division of U.S. patent application Ser. No. 15/436,631, filed on Feb. 17, 2017, now issued as U.S. Pat. No. 10,037,537, which is a non-provisional of, and claims priority pursuant to 35 USC § 119(e) to the following applications: U.S. provisional application No. 62/297,262 filed Feb. 19, 2016, U.S. provisional application No. 62/297,285 filed Feb. 19, 2016, U.S. provisional application No. 62/297,334 filed Feb. 19, 2016, and U.S. provisional application No. 62/297,343 filed Feb. 19, 2016, the disclosure of which is incorporated by reference herein in their entireties.

U.S. Non-provisional patent application Ser. No. 14/531,307, entitled DIGITAL FINGERPRINTING TRACK AND TRACE SYSTEM, filed on Nov. 3, 2014, now issued as U.S. Pat. No. 9,582,714, is incorporated by reference as though fully set forth.

Copyright © 2016-2017 Alitheon, Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR § 1.71(d).

BACKGROUND

Counterfeiting of manufactured goods is a worldwide problem, with recent studies estimating that 8% of the world's total GDP is now generated by the manufacturing and sales of counterfeit products. Many classes of counterfeit goods create substantial risks to public health including counterfeit pharmaceutical drugs, auto parts, pesticides, and children's toys. In addition, counterfeit computer chips, aerospace parts, and identification documents present significant risks to national security.

Authentication alone is not enough to stop counterfeiting. Counterfeiters use a variety of strategies, including diverting unfinished products from factories that make authentic goods and then adding their own counterfeit brand identifiers such as labels and tags. Counterfeit items can enter the supply chain at any point, including at the original manufacturing facility, at the shipper, in distribution, or in retail stores. Unless the manufacturer or supplier can identify exactly where and when the item entered the supply chain, identifying and eliminating the counterfeit goods can be almost impossible.

Many different approaches have been tried to uniquely identify and authenticate objects, including labeling and tagging strategies using serial numbers, bar codes, holographic labels, RFID tags, and hidden patterns using security inks or special fibers. All of these methods can be duplicated, and many add a substantial extra cost to the production of the goods sought to be protected. Physical labels and tags can also be easily lost, modified, or stolen.

BRIEF DESCRIPTION OF THE DRAWINGS

In order to describe the manner in which the above-recited and other advantages and features of the disclosure can be obtained, a more particular description follows by reference to the specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 14 illustrates a process of classifying item change.

DETAILED DESCRIPTION

Figure 1A:
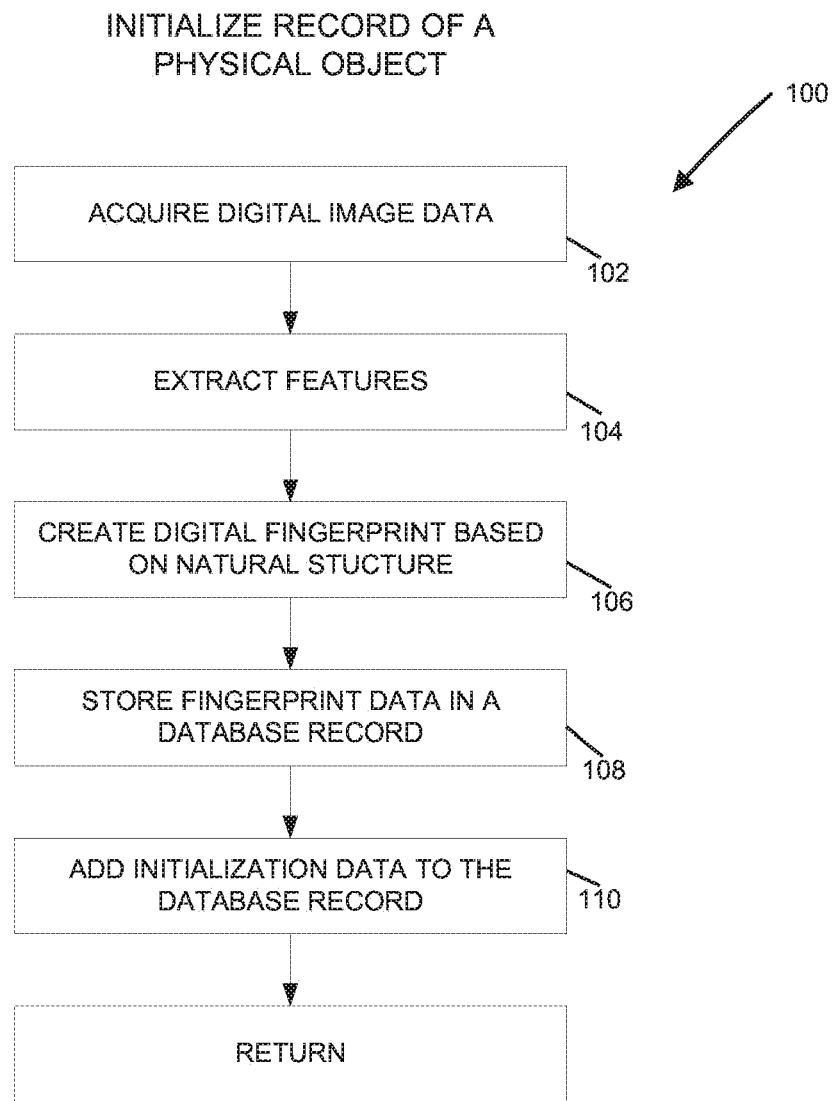
FIG. 1A is a simplified flow diagram illustrating a method for creating a storing a digital fingerprint of an object in a database.

In this application, we use the term "scan" in a broad sense. We refer to any means for capturing an image or set of images, which may be in digital form or transformed into digital form. The images may be two dimensional, three dimensional, or be in the form of a video. Thus a "scan" may refer to an image (or digital data that defines an image) captured by a scanner, a camera, a specially-adapted sensor array such as CCD array, a microscope, a smart phone camera, a video camera, an x-ray machine, etc. Broadly, any device that can sense and capture electromagnetic radiation that has traveled through an object, or reflected off of an object, is a candidate to create a "scan" of the object. Various means to extract "fingerprints" or features from an object may be used; for example, through sound, physical structure, chemical composition, or many others. The remainder of this application will use terms like "image" but when doing so, the broader uses of this technology should be implied. In other words, alternative means to extract "fingerprints" or features from an object should be considered equivalents within the scope of this disclosure.

Authentication Regions

In an embodiment, individual objects are scanned and a unique digital signature is generated by a digital fingerprinting method that utilizes the object's natural structure or features. The object is registered in the system database. Once the object is registered, the Digital Fingerprinting Track and Trace System can track the location of any object as it passes through a supply chain, distribution network, or sales channel. The system maintains a database record for each unique object, and can store any relevant data related to the object over the course of its lifetime. The system can be queried, generate reports, and analyze data on individual objects or on sets of objects. Applications of the system include but are not limited to object authentication, determining the provenance of an object, creating audit trails, and identifying where counterfeit goods are entering manufacturing, distribution or sales networks.

In other applications, an original digital fingerprint can be compared to a subsequent digital fingerprint of an object to establish that the object is the original, without regard to its history of locations or possession since the original digital fingerprint was acquired and stored.

Another aspect of some embodiments relates to detecting a counterfeit or forged object, for example a document such as a drivers license or passport. In this case, there may be no "original" or source object digital fingerprint for comparison. Rather, "fingerprints" of known indicia of counterfeit or forged objects can be acquired and stored. For example, a large number of bogus New York State driver's licenses might be obtained by law enforcement officials in a raid or the like. Digital images of those forged documents can be acquired, and analyzed to form digital fingerprints, as described in more detail below.

In an embodiment, "Forgery feature vectors" can be collected and stored in a database, for example, sharp, non-bleeding edges where a photograph has been replaced or torn paper fibers where an erasure occurred. These fingerprints can be searched and compared to detect a forged document. A count of "fraud indicator matches" can be compared to an empirical threshold to determine a confidence that a document is forged (or not).

Because digital fingerprinting works with many different types of objects, it is necessary to define what parts of the digital images of the objects are to be used for the extraction of features for authentication purposes. This can vary widely for different classes of objects. In some cases it is the image of the entire object; in other cases it will be a specific sub-region of the image of the object. For instance, for a photograph we may want to use the digital image of the entire photograph for feature extraction. Each photograph is different, and there may be unique feature information anywhere in the photograph. So in this case, the authentication region will be the entire photograph.

Multiple regions may be used for fingerprints for several reasons, two of which are particularly important. It may be that there are several regions where significant variations take place among different similar objects that need to be distinguished while, in the same objects, there may be regions of little significance. In that case a template may be used (see below) primarily to eliminate regions of little interest.

A bank note, for example, can be authenticated if a few small arbitrary regions scattered across the surface are fingerprinted, along with recognizing the contents of a region telling the value of the bank note and one containing the bank note's serial number. In such a case the fingerprints of any region (along with sufficient additional information to determine the bank note's value and its purported identity) may be sufficient to establish the authenticity of the bill and multiple fingerprinted regions are used solely in the event that one or more regions may be absent (through, for example, tearing) when the bill is later presented for authentication. Sometimes, however, all regions of an item must be authenticated to ensure the item is both authentic and has not been altered.

Figure 6:
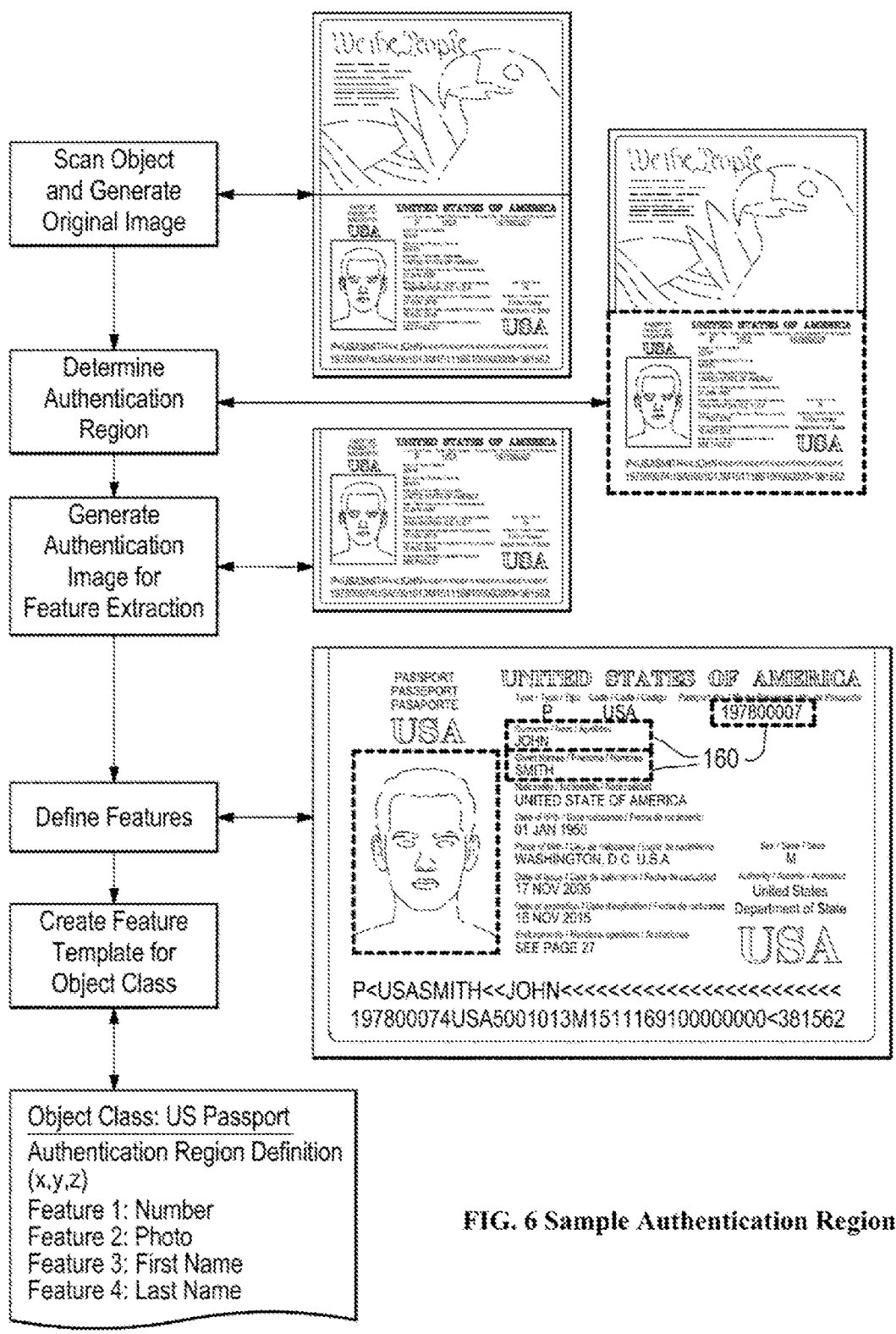
FIG. 6 illustrates an example of authentication region and object feature definition for a U.S. passport.

A passport provides an example of feature extraction from an authentication region; see FIG. 6. On a passport, the features that we may want to use for authentication may be extracted from regions containing such specific identification information as the passport number, recipient name, and recipient photo, as illustrated in FIG. 6. In that case one may define a feature template specifying those regions whose alteration from the original would invalidate the passport, such regions including the passport holder's photo and unique personal data.

The ability to define and store the optimal authentication region for a given class of objects offers significant benefits to the user, although it is not mandatory. In many cases it is much easier to scan a limited region of an object than the entire object. For instance, in the case of an article of designer clothing, it is much easier to take a picture of the manufacturer's label than it is to take a picture of the entire garment. Further, defining such regions enable the detection of partial alteration of the object.

Once an authentication region is defined, specific applications can be created for different markets and classes of objects that can assist the user in locating and scanning the optimal authentication region. For instance, an appropriately sized location box and crosshairs can automatically appear in the viewfinder of a smartphone camera application to help the user center the camera on the authentication region, and automatically lock onto the region and take the picture when the camera is focused on the correct area. It should be noted that while some examples discussed above are essentially two-dimensional objects (passport, bank note), the present disclosure is fully applicable to three-dimensional objects as well. Scanning or image capture may be 2-D, 3-D, stereoscopic, HD etc. Image capture is not limited to the use of visible light and fingerprint data capture is not limited to images.

In many cases, objects may have permanent labels or other identifying information attached to them. These can also be used as features for digital fingerprinting. For instance, wine may be put into a glass bottle and a label affixed to the bottle. Since it is possible for a label to be removed and reused, simply using the label itself as the authentication region is often not sufficient. In this case we may define the authentication region to include both the label and the substrate it is attached to—in this case some portion of the glass bottle. This "label and substrate" approach may be useful in defining authentication regions for many types of objects, such as consumer goods and pharmaceutical packaging. If a label has been moved from it's original position, this can be an indication of tampering or counterfeiting. If the object has "tamper-proof" packaging, such areas as may be damaged in attempts to counterfeit the contents may also be useful to include in the authentication region.

In some cases, we will want to use multiple authentication regions to extract unique features. For a firearm, for example, we might extract features from two different parts of the weapon. It is, of course, important that both match the original but since the two parts may both have been taken from the original weapon and affixed to a weapon of substandard quality, it may also be important to determine whether their relative positions have changed as well. In other words it may be necessary to determine that the distance (or other characteristic) between Part A's authentication region and Part B's authentication region is effectively unchanged, and only if that is accomplished can the weapon be authenticated. Specifications of this type can be stored with or as part of a digital fingerprint of the firearm.

Once one or more suitable digital fingerprints of an object are acquired, the object (actually some description of it) and corresponding fingerprint may be stored or "registered" in a database. For example, in some embodiments, the fingerprint may comprise one or more feature vectors. The database should be secure. In some embodiments, a unique ID also may be assigned to an object. An ID may be a convenient index in some applications. However, it is not essential, as a digital fingerprint itself can serve as a key for searching a database. In other words, by identifying an object by the unique features and characteristics of the object itself, arbitrary identifiers, labels, tags, etc. are unnecessary and, as noted, inherently unreliable.

FIG. 1 is a simplified flow diagram illustrating a method 100 for creating and storing or "registering" a digital fingerprint of an object in a database. The process in one embodiment includes acquiring a digital image of the object, block 102, as discussed above. A variety of image capture technologies and devices may be used as noted. Next, features are extracted, block 104, from the digital image data. As explained, specific features or regions of interest (authentication regions) may be selected in support of subsequent identification or authentication of the object. The extracted features are analyzed and feature vectors are extracted to form a digital fingerprint—a digital file or record associated with the original image data, indicated at block 106. The digital fingerprint preferably may be stored in a database record at block 108. Other forms of searchable digital data storage should be deemed equivalents. Further, at block 110, initialization data should be added to the database record, or associated with it in a related table. This data is associated with the physical object that was scanned. For example, a description, manufacturer, model number, serial number, contents—a wide variety of data, selected as appropriate or useful depending on the type of object.

Figure 1B:
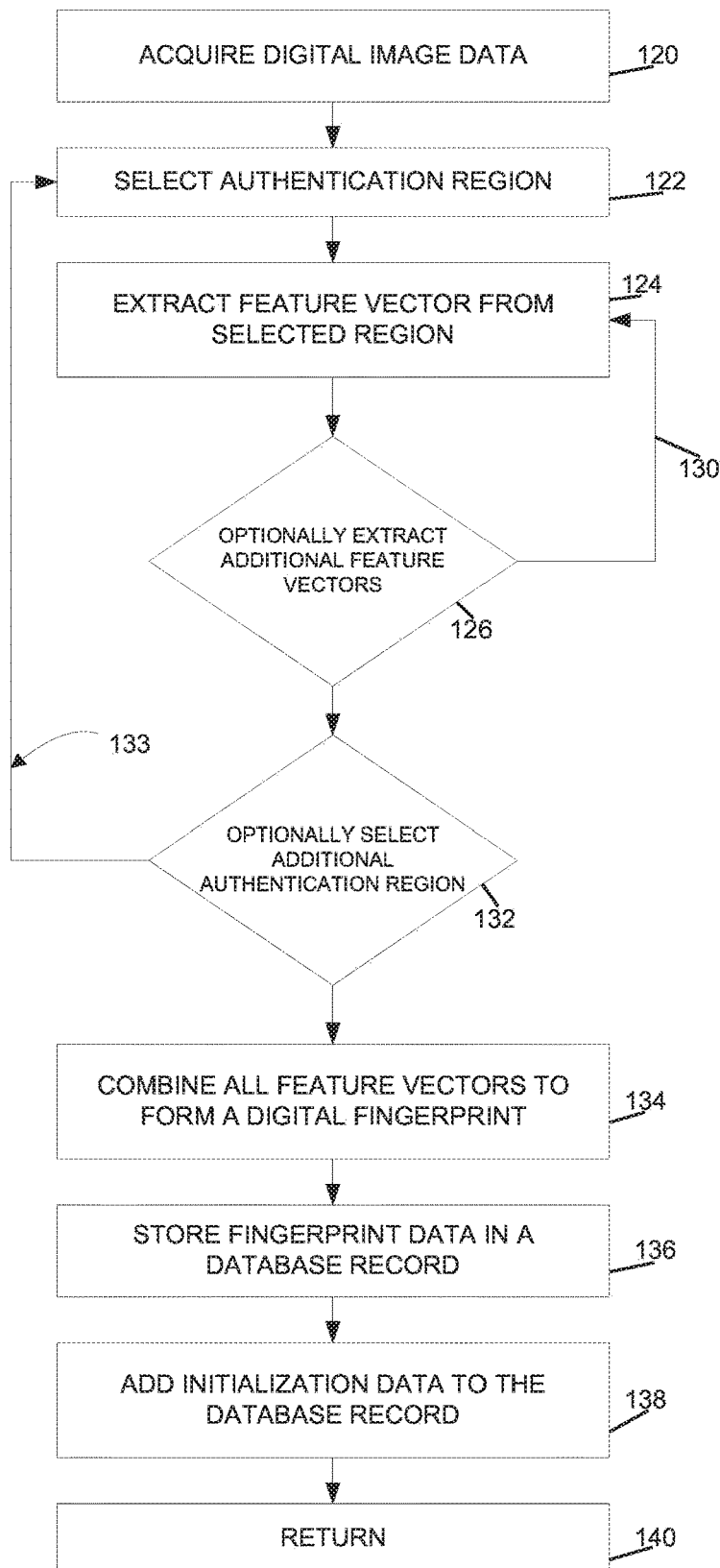
FIG. 1B illustrates a process that includes more robust feature extraction.

FIG. 1B illustrates a process that includes more robust feature extraction. In this example, we again begin with acquiring digital image data, block 120. We select at least one authentication region, block 122. This may be done by analysis of the image data, analysis of related image data, by reference to a predetermined template that defines at least one authentication region, or other means. The next block 124 calls for extracting a feature vector from the selected authentication region. A feature vector may be used to represent features of a region in a more compact form. For example, a feature vector may comprise an array of color or gray scale numeric values corresponding to areas within the selected authentication region. The values may each comprise a sum, average, maximum or other function of the individual values of a corresponding group of pixels forming a sub-part of the region. In some applications, a feature vector may identify a location and shape of a distinctive aspect within a selected region. In decision 126, there may be additional feature vectors to be extracted from the same image data. In that case, the flow returns, path 130, to repeat the feature extraction step 124. This loop 130 may repeat until all desired feature vectors are collected. Optionally, there may be another authentication region to process in the same image data, see decision 132. In that case, the outer loop 133 is traversed back to block 122 for further feature extraction with respect to one or more additional authentication regions. Then some or all of the extracted feature vectors may be combined to form a digital fingerprint, block 134, which is then stored, block 136, along with related data, block 138, as mentioned above. The process returns or concludes at block 140.

A database of digital fingerprints can form the basis of a system to track and trace the object through a supply chain, distribution network, or sales channel. A track and trace system based on digital fingerprinting has unique advantages and provides unique capabilities that are not available with track and trace systems based on traditional methods.

Holograms, bar codes and serial numbers can all be duplicated with varying degrees of effort. This means that if the code or tag can be duplicated, then counterfeit objects or two objects with the same identifier can exist in the supply chain or distribution network. They can then be registered in a traditional track and trace system. All such systems rely on determining that the anti-counterfeit item (label, hologram, RFID tag) is legitimate, not that the item itself is.

Due to this weakness, track and trace systems based on traditional approaches like bar codes or serial numbers cannot prevent the resulting corruption of the system database. A counterfeit object may be mistakenly identified as genuine, and generate a false audit trail as it is tracked through the supply chain. Two or more objects with the same ID (one genuine, one or more counterfeit) may exist at the same time. Without physically examining the objects it is impossible to tell which item is genuine. Evin if the objects can be physically inspected, determining which (if either) is authentic may require a subject matter expert. Once identification is made as to which object is genuine, the false trails must be removed from the database to restore integrity. This can be extremely difficult depending on the structure of the database and the complexity of the tracking data. In some cases the objects may not have any further contact with the track and trace system (for instance if they are purchased by a consumer), and the record will never be identified as false, leaving the database permanently corrupted.

In one embodiment of the Digital Fingerprinting Track and Trace System, an item may be scanned and identified at initial manufacture. Alternatively, an item may be scanned and identified at any subsequent time or location for entry into a tracking system. This point of identification preferably is done when the item is either in the possession of its manufacturer or has been transferred by secure means to the current holder so that its legitimacy at the point of identification is adequately established. Alternatively, an item may be identified or authenticated by a subject matter expert and scanned at that time for entry into a tracking system.

Figure 2:
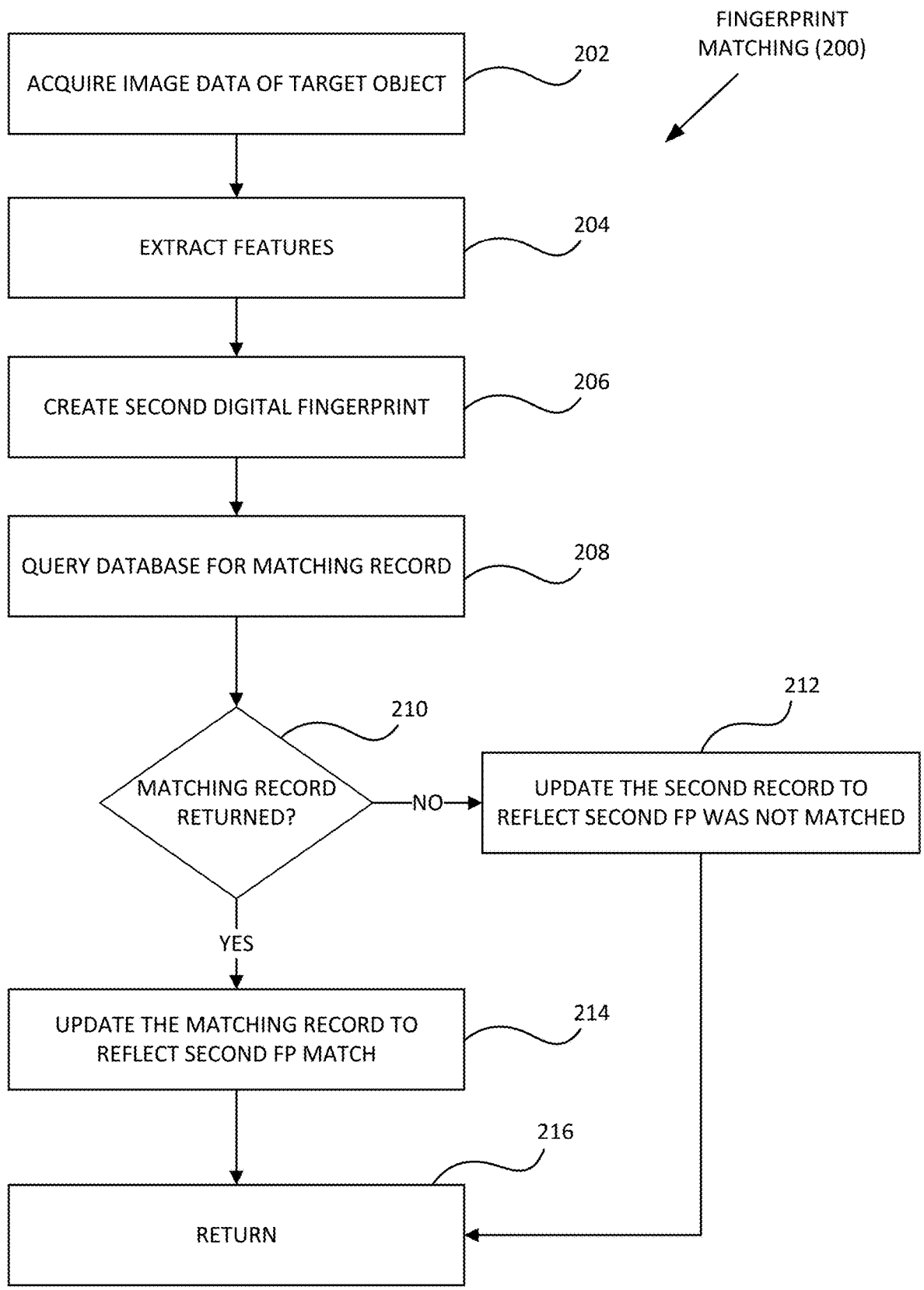
FIG. 2 is a simplified flow diagram illustrating a method for matching a digital fingerprint of a target object to a database of existing digital fingerprints.

The system then identifies the object every time it is scanned again, typically at discrete steps in manufacturing, distribution, and sale. FIG. 2 is a simplified flow diagram illustrating a method 200 for matching a digital fingerprint of a target object to a database of existing digital fingerprints. Here, we acquire image data of a "target object" i.e., the object we want to identify or authenticate by finding a match in the database, see block 202. We extract features from the target object image data, block 204, as discussed above. Then we create a new (second) digital fingerprint based on the extracted features, block 206. The next step is querying the database, block 208, for a record that matches the second digital fingerprint record. "Matching" in this context may be relative to a threshold confidence level rather than a binary decision or to a match confidence level with some other object (e.g., identify an object as legitimate when it matches the reference of a legitimate object better (e.g., considerably better) than it matches any other object in the database). The requisite confidence level may vary depending on the specific application. The confidence level required may be varied dynamically responsive to the data and experience with a given system. If no "matching" record is returned, decision 210, update the second record (the digital fingerprint of the target object), block 212, to reflect that no match was found. If a match is returned, the matching record is updated to reflect the match, block 214 (for example, it may be linked to the second record). The results may be returned to the user. The process returns or concludes at block 216.

Figure 3:
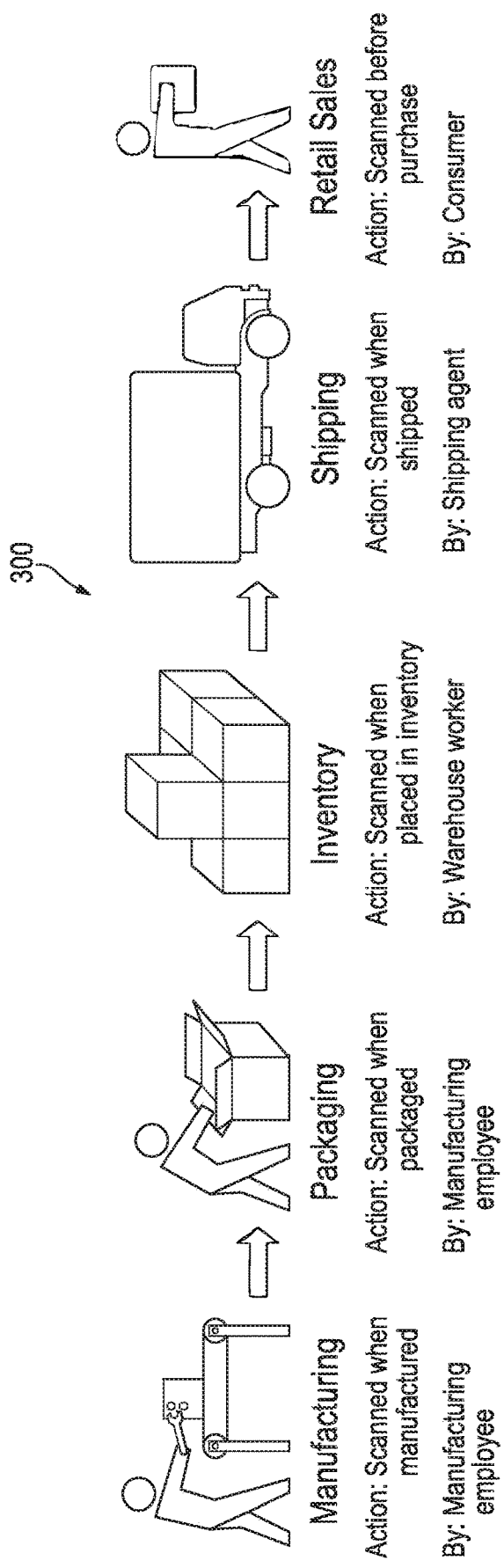
FIG. 3 is a simplified conceptual diagram showing scanning of an object at various times and places along a manufacture and distribution chain.

Typical tracking steps might include scanning at the point of manufacture, when packaged, when placed in inventory, when shipped, and at a retail point of purchase (upon arrival and again when sold), as illustrated in the tracking process 300 of FIG. 3. Each scan can be used to update a remote database.

As mentioned earlier, a "scan" may refer to an image (or digital data that defines an image) captured by a scanner, a camera, a specially-adapted sensor array such as CCD array, a microscope, a smart phone camera, a video camera, an x-ray machine, etc. Broadly, any device that can sense and capture electromagnetic radiation (or any identifying information, e.g., sonar etc., that has traveled through an object, or reflected off of an object, is a candidate to create a "scan" of the object. It is critical to capture at least one native feature of the object, which may be of an original region of the object as distinguished from a region having a feature added to the object for identification, such as a label, bar code, RFID tag, serial number, etc. In some cases, the native feature may of a non-original region in which an object has been added to the physical object for identification (such as a label). The added object may be affixed (e.g., permanently affixed) to the physical object, such as through an adhesive in the case of a label. So long as the added object (e.g., the label) because an integral part of the physical object, we can scan the added object to obtain a digital fingerprint and use that digital fingerprint to track the physical object. In some embodiments, the digital fingerprint corresponds to an original region, a non-original region (corresponding to where an object has been added for the purpose of, for instance, identification of the physical object), or combinations thereof.

A "native feature" in this description may not be concerned with reading or recognizing meaningful content, even in the case where the digital fingerprint corresponds to a non-original region. For example, a label on a scanned object with a printed serial number may give rise to various features in fingerprint processing, some of which may become part of a digital fingerprint feature set or vector that is associated with the object. The features may refer to light and dark areas, locations, spacing, ink blobs, etc. This information may refer to the printed serial number on the label, but there is no effort to actually "read" or recognize the printed serial number (which may be bogus). Similarly, an RFID tag applied to an object may give rise to a fingerprint vector responsive to its appearance and location on the object. However, in some examples no effort is made to actually stimulate or "read" data or signals from the tag. In some embodiments we are not using the added object according to the tracking scheme from which it originated. The various features used in fingerprint processing, some or all of which may become part of a digital fingerprint set or vector that is associated with the physical object, may be extracted from a permanently affixed label (for the purposes presented here the contents of the label, e.g., the value of the serial number) may be irrelevant.

While the most common application of track and trace systems is in manufactured goods, the present system and methods, in various different embodiments, may be applied to any object that can be identified with a digital fingerprint and tracked. These include but are not limited to mail pieces, parcels, art, coins, currency, precious metals, gems, jewelry, apparel, mechanical parts, consumer goods, integrated circuits, firearms, pharmaceuticals, and food and beverages. Tracking may consist of any sequence of actions where the object is scanned, such as each time an object is appraised, authenticated, certified, auctioned, displayed, or loaned. The system may store both positive and negative authentication transactions. In an embodiment, the system may store location information (associated with a scan or fingerprint), which provides a profile of where either counterfeit or legitimate goods may be encountered.

Figure 4:
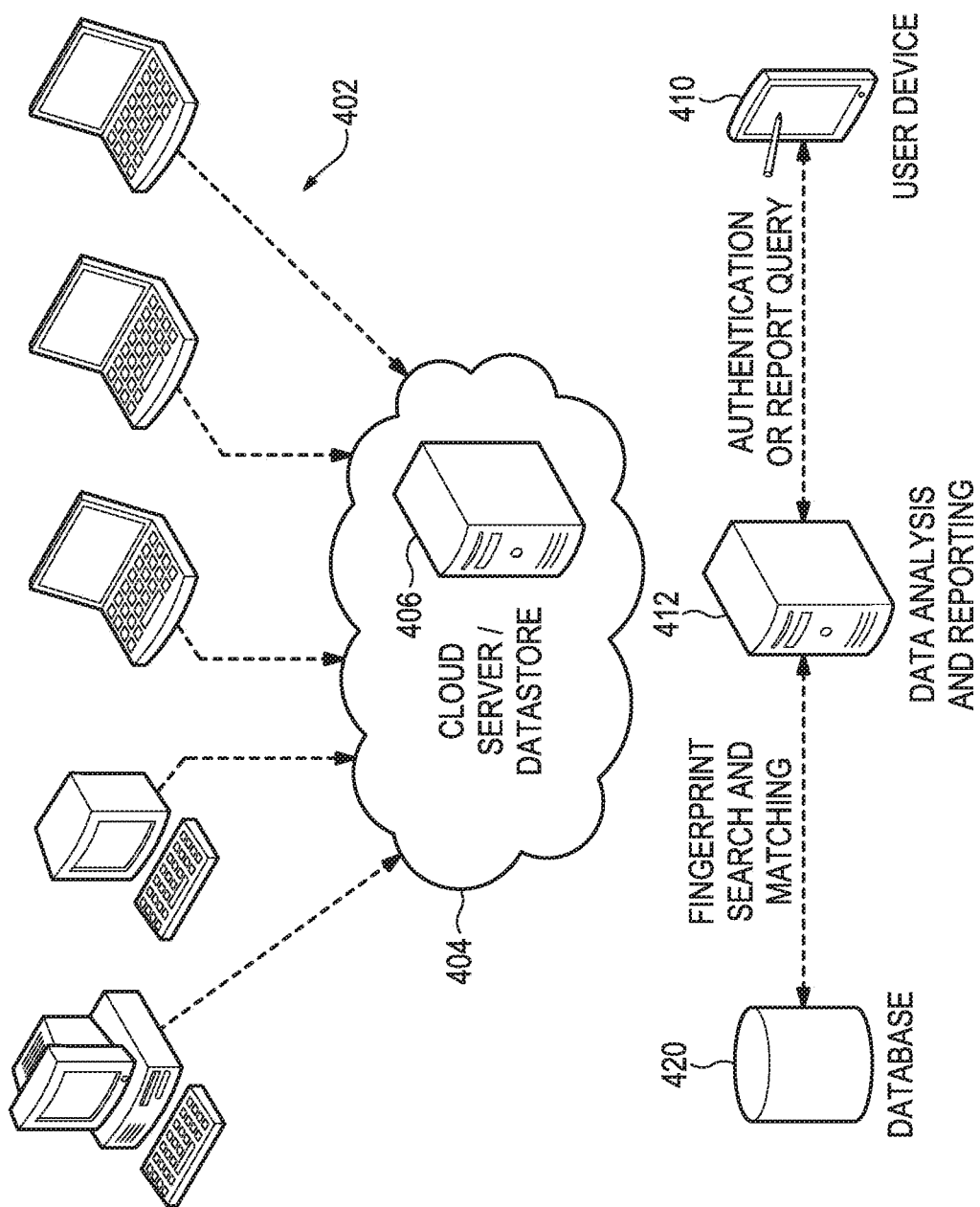
FIG. 4 is a simplified conceptual diagram illustrating a database system and use of a mobile device application to query authentication information related to an object.

FIG. 4 is a simplified conceptual diagram illustrating a database system and use of a mobile device application to query authentication information related to an object. Here, various computing devices or terminals 402 may have access over a network, for example, the Internet 404, to cloud computing facilities/services such as a cloud server/datastore 406. For example, the devices 402 may be located at various points along a distribution chain as illustrated in FIG. 3, each location scanning an object and updating the cloud server/datastore 406.

In some embodiments, the mobile device application may acquire image data of at least a portion of a target physical object. The mobile device application may utilize a camera integrated or coupled to the devices 402 to acquire the image data, in some examples. The mobile device application may analyze the image data to form a digital fingerprint. The mobile device application may query a datastore, such as the datastore 420, to seek a matching record based on the digital fingerprint. The mobile device application may update a database record of the datastore 420 with an indication that the digital fingerprint was matched to the database record.

A server 412 may be provisioned to provide tracking and/or tracing data analysis and reporting. The server 412 has access to a datastore 420 which may be used to store digital fingerprints and related data. The server can query or search the database 420 for digital fingerprint search and matching. The database 420 preferably is coupled to the cloud server 406 in some embodiments. A mobile user device 410 such as a smartphone, tablet, laptop computer or dedicated device may be configured for communications with the server 412 to request and receive a reply or authentication report for an object of interest. This architecture is simplified and in any event is merely illustrative and not intended to be limiting.

Continuous and Discrete Tracking

In some implementations, sensors may be attached to the object, and sensor data can flow back to the database in either a continuous fashion (near real time), or in discrete data transfer events. For example, data transfer may occur when an authentication event occurs. For instance, if there is a GPS chip attached to the object, data flow can start when the object is first registered in the system, and continue to flow as the object changes location. Continuous (frequent) data updates can also be buffered in local memory in a sensor attached to the item, and then downloaded the next time the object is scanned and authenticated. This provides a record of where the object has traveled (its itinerary).

As an example of the potential uses of sensor data, many products like food and beverages can degrade with exposure to certain environmental factors over the course of their storage and shipment. Examples of sensor data could include temperature, light exposure, altitude, oxygen level, or other factors, as well as location such as GPS data.

Figure 5:
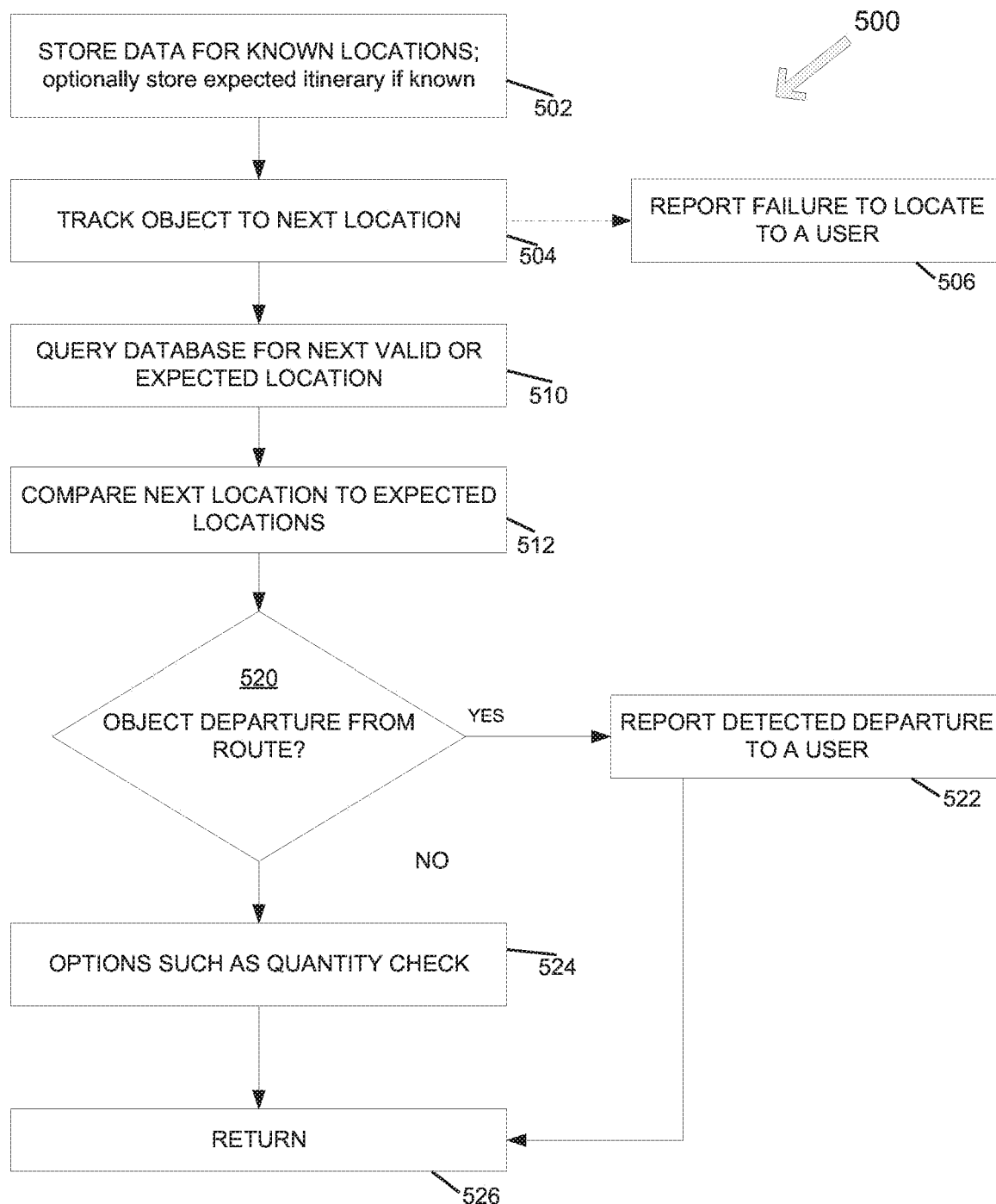
FIG. 5 is a simplified flow diagram illustrating a method for tracking an object to verify its provenance.

FIG. 5 is a simplified flow diagram illustrating one embodiment of a process 500 for tracking an object to verify its provenance. Here, an expected itinerary of an object (a series of locations) may be stored in a datastore if known, block 502. The methods and systems described above may be used to track the object to the next location, block 504. If the object does not arrive as expected (where and when expected according to the itinerary), the failure may be reported to a user. In an embodiment, an object that arrives significantly earlier or later than expected may be subjected to closer matching scrutiny to ensure its identity.

The next step, block 510, is to query the database for the next valid or expected location. A unique itinerary may not be known, but a set of valid or expected locations may be known. The next actual location of the object (as determined by imaging and matching digital fingerprints) may be compared to the expected location(s) returned by the database, block 512. If that comparison indicates a departure from the expected or authorized route, decision 520, the result may be reported to a user, block 522. (A report that the object is on track may be reported as well.) Other options may be implemented such as a quantity check, block 524. The process returns or terminates at block 526.

Most existing track and trace systems are only designed to be accessed by manufacturers or their authorized distributors, and often require specialized scanners or equipment. However, the consumer also has a vested interest in determining whether the items that they are buying are authentic or to determine where they are. In some embodiments, the present system is designed to enable anyone along the supply, distribution, or sales chain, from manufacturer to the retail consumer, to access the system and determine whether the item is authentic and where it is (e.g., a current location when it is being shipped to consumer). A specialized scanner is not required in all cases. For example, in one embodiment a mobile phone application designed for the consumer can be used to scan an object, query the database, and determine if the object is authentic and retrieve current data about it.

Finally, data collected by a digital fingerprinting system offers a variety of useful information to people along the supply, distribution and sales chain. Reports can be generated on individual items, or on sets of items. These reports can include but are not limited to the locations of items over time, audit trails, points of entry of counterfeit goods, and exposure to environmental variables over the course of an object's lifetime.

Tags and Bar Codes

A tag may be added to an item, a barcode to a mail piece, etc. for two reasons. First, the human may need it to know what the item is. This is the identification function. It may identify the item to a store clerk as a particular style and size of clothing of a particular manufacturer, it may tell a postal carrier where to deliver a mail piece. Second, however, are tags that are only useful for a machine. Thus a four-state bar code on a mail piece (unreadable by humans) is used to route the mail piece by machine. This entire class of machine readable tags can be replaced by the methods of this patent. The first set may still be needed for human use but are now divorced from their authentication function.

Because we are exploiting natural features and often scanning the object under variable conditions, it is highly unlikely that two different "reads" will produce the exact same fingerprint. We therefore have to introduce the ability to look up items in the database when there is a near-miss. For example, two feature vectors [0, 1, 5, 5, 6, 8] and [0, 1, 6, 5, 6, 8] are not identical but (given the proper difference metric) may be close enough to say with certainty that they are from the same item that has been seen before. This is particularly true if, otherwise, the nearest feature vector of a different item is [5, 2, 5, 8, 6, 4]. For example, a distance between vectors of n-dimensions is easily calculated, and may be used as one metric of similarity or "closeness of match" between the vectors. One may also consider the distance to the next nearest candidate.

Obviating the Chain of Custody

Many systems rely on a known "chain of custody" to verify authenticity of an object. The rules of evidence in court, for example, typically require proof of a chain of custody to demonstrate authenticity of a hair sample, weapon or other piece of physical evidence. From the time an object is collected at a crime scene, for example, it is typically bagged, tagged, and moved into a locked box or evidence room for safekeeping. Each person who removes it must attest to returning the original item unchanged. Custody of the object from the crime scene to the evidence locker to the courtroom must be accounted for as an unbroken chain. Digital fingerprinting techniques as disclosed herein can be used to obviate most of that process. Provided an original object is under the control and custody of an authorized or trusted entity at least once, and a digital fingerprint, or an image suitable for forming a digital fingerprint of the object, is acquired under such circumstances and stored, the object is uniquely identifiable thereafter by that fingerprint for the lifetime of the object.

Because digital fingerprinting works by extracting key features of an object, it may be used to identify or authenticate objects even after a good deal of wear and tear. At any subsequent time, a suspect or "target" object can be similarly "fingerprinted" and the subsequent fingerprint compared to the stored fingerprint of the original object. If they match, authenticity is established, regardless of where or in whose custody the object may have traveled in the meantime. Returning to the crime scene example, if a digital fingerprint is acquired of a weapon taken from the crime scene, and the digital fingerprint stored, the weapon can be fingerprinted again at any subsequent time, and the digital fingerprints compared to authenticate to weapon. Custody of the weapon in the interim is no longer an issue. Likewise when a coin or piece of art is stolen, our technology gives us the ability to continue the original provenance even though chain of custody has been lost (i.e. we know it is the same coin we saw before even though it has not been in our direct possession during the time between theft and recovery).

Global vs. Regional Feature Matching

In a case where we have the original document or other object fingerprinted, our techniques allow region-by-region matching so that we can tell what (if any) regions have been changed. Thus, for example, we might get a really good overall match on a passport but none of the matches happen in the photograph—so we know the photograph probably was changed. Further, if some individual or group, say Al Qaeda, has a certain pattern or regularity to altering passports—change the photo, the date of birth and one digit of the passport number, say—then this ability to find altered regions also gives us the ability to discern the pattern of changes and thus develop a signature of the group making the changes. Thus aspects of the present technology can be applied not only to detect a forged or altered document, but to identify in some cases the source of the bogus document.

Multi-Level Authentication

Some systems using digital fingerprinting work by converting naturally-occurring features (or features that occur as a side effect of the manufacturing process) on an item into a vector that is stored in a database until the object is later presented for authentication, in various embodiments. At that point a new digital fingerprint may be extracted and compared with the digital fingerprint(s) in the database. When sufficient match is found, the item is considered authenticated.

Items can be tracked and authenticated throughout their life cycle as they are produced, aggregated into, say, boxes of parts (some examples may utilize multiple levels of packaging), shipped while aggregated, broken into individual items, assembled into, say products, and finally made available to the final consumer. Items may be tracked at all levels whether or not they are temporarily or permanently part of some aggregate. Thus not only the final item received by the consumer but also all the intermediate aggregates and components can be tracked as a coherent whole, with each component stream trackable in its own right and as parts of the whole.

Some embodiments may utilize fingerprint-based authentication for multi-layered authentication; however, this is not required. Multi-level authentication may be applied to any form of authentication in which:

There are multiple levels of packing, assembling, disassembling, or otherwise layering the items; and Any history, tracking, or authentication done on each level is considered appropriate also for the level below, e.g., for the items inside the packaging.

In some embodiments in which any history, tracking, or authentication done on each level is considered appropriate also for the level below, some embodiments may include a scheme to ensure that the contents of the package have not been tampered with and that items within the higher layer may be authenticated upon entry and/or upon removal from the layer.

In some embodiments, a network of track and trace and authentication data may be built, stored in a database, and accessed where appropriate for all the components, subsystems, and complete parts in a system. Such embodiments may be utilized for items that by their nature are aggregated at some point in their life cycle (e.g., wine, electronic devices, etc.).

Wine may be digitally fingerprinted (or otherwise set up for tracking and/or authentication) when bottled, then the case into which it is shipped be separately authenticated. Finally the containers into which the cases are placed for shipping can also be digitally fingerprinted. The shipping container may include a tamper-proof seal so that one may be sure that the contents of a shipping container, for example, are not substituted or removed during the period the wine cases are supposed to be inside. During the period of aggregation, each bottle is tracked if the case is tracked; each case is tracked if the container is tracked, and the history of the upper level becomes the history of the lower. This may include track and trace information and/or other possible metadata such as temperature measurements, acceleration measurements, pressure (e.g., atmospheric pressure) measurements, humidity measurements, chain of ownership, location, or the like, or combinations thereof.

In some embodiments, component and/or system tracking may be used. A system may include an electronic device for use in a critical system in an airplane, which may include components such as chips. Detection of substitution of the correct chips with lower-performance chips may be a concern. In some embodiments, chips may be digitally fingerprinted at manufacture and each may be given history data (which may include all metadata) and a set of digital fingerprints (or a respective one of a set of digital fingerprints). The history data may be used to establish that the history for each chip is acceptable to the final consumer and/or a regulatory body, while the digital fingerprints may be used to authenticate the appropriate parts where needed.

The chips may be shipped to a company that assembles them into systems, such as processing cards. A process used for the assembly of the cards and/or a nature of the processing cards may preclude undetectable removal of parts (e.g., chips) from the processing cards. Accordingly, the processing cards may become the primary trackable item going forward (for critical systems the individual chips may continue to be authenticated). Later the processing cards may be put into (e.g., installed) a final part which may itself be digitally fingerprinted and shipped to the final user where, if the final part is secure from tampering, authenticating the final part also authenticates all items in the part manifest.

Figure 7:
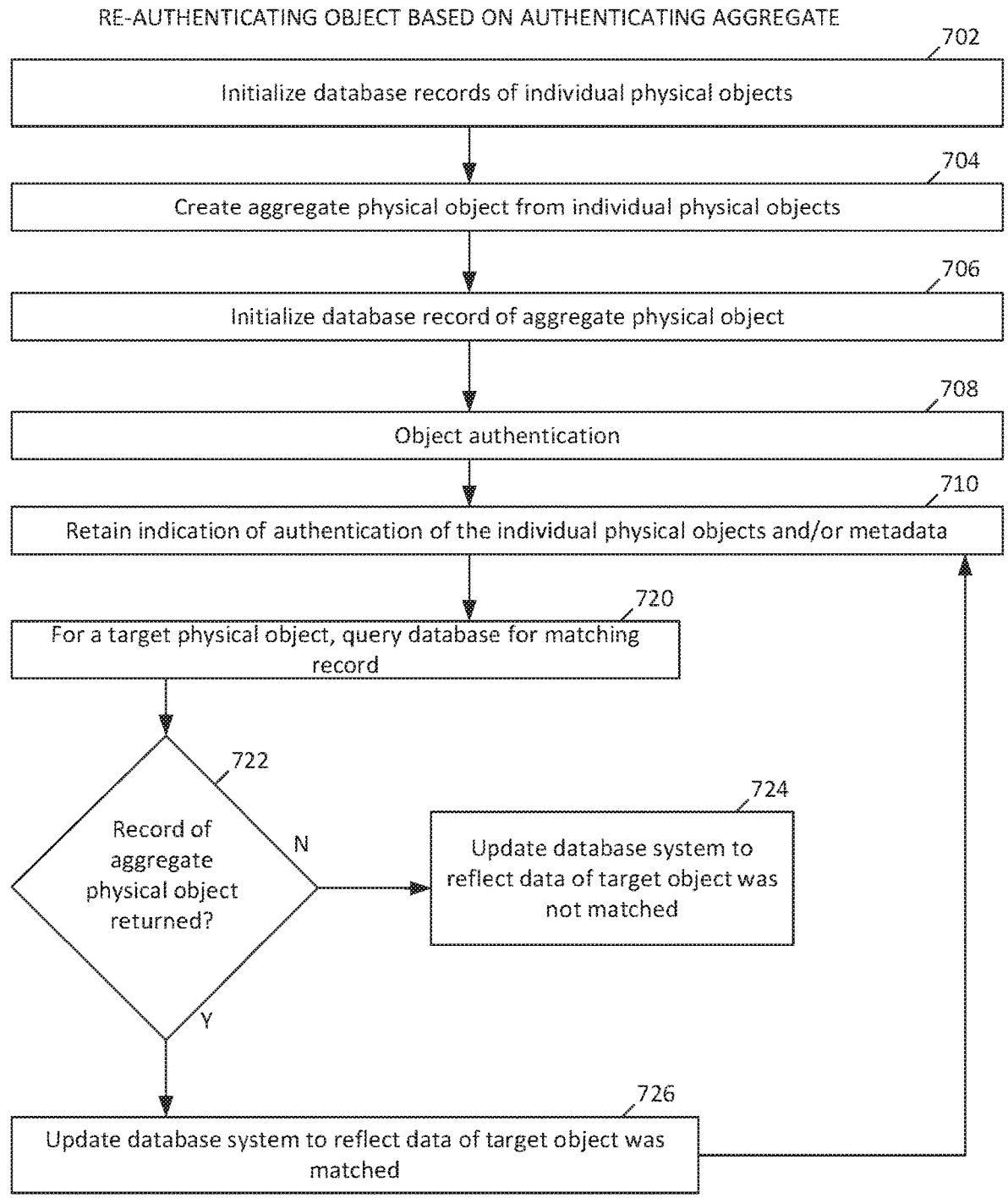
FIG. 7 illustrates a process of re-authenticating an object based on authenticating an aggregate.

FIG. 7 illustrates a process 700 of re-authenticating an object based on authenticating an aggregate.

The process 700 can be used in digital fingerprinting embodiments, or any embodiments using a database system used for tracking and/or authenticating multilevel items (such as wine bottles in wine cases, chips on processing cards, etc.). In the case of digital fingerprinting embodiments, a physical object (such as a wine bottle or chip) may be digitally fingerprinted using the devices of FIG. 4 in association with forming an aggregate physical object (such as a wine case including the wine bottle or a processing card including the chip). Later, such as at a different location in a supply chain, the aggregate physical object may be authenticated using the devices of FIG. 4. An indication of a re-authentication of the physical object may be stored in the database system. In some embodiments, additional data associated with the authentication of the aggregate physical object may also be stored in the database. The additional data may include metadata about the authentication (location, confidence, etc.) and/or data collected in association with the authentication, such as a temperature measurement, a reading from a sensor, etc.

In some embodiments, the indication of re-authentication may be stored in one or more first database record(s) different than the second database record for the aggregate object. The one or more first database record(s) may be linked to the second database record.

Besides digital fingerprinting embodiments, it is also possible to authenticate the aggregate object using any other authentication scheme. For instance, a value from an object added to the aggregate physical object for the purpose of authentication and/or tracking could be read at the different location, validated, and an indication of re-authentication could be stored in the database system responsive to result of the validation of the value. The processes of multilevel authentication described herein, such as the process 700 and a process 800 (FIG. 8), are not limited to digital fingerprinting. Regardless of the type of authentication used (digital fingerprinting or otherwise), other information besides a binary result (e.g., authenticated, or not) may also be stored in the database (e.g., in a database record for the aggregate and/or database records for the individual objects) responsive to the result of the validation of the value (e.g., information about a confidence of the indication of re-authentication may also be stored in the database, authentication information such as a digital fingerprint or value associated with the physical object, or the like, or combinations thereof).

In block 702, a database system (e.g., the database system of FIG. 4) may initialize database records of individual physical objects. In block 704, an aggregate physical object may be created from the individual objects (e.g., a processing card may be manufactured by fixably coupling a chip to a processing card, a bottle of wine may be loaded into a case, etc.). In block 706, the database system may initialize a database record for the aggregate physical object. The database record may be a different record that is linked to the database records for the individual objects, in some examples.

In block 708, object authentication may be performed, for example the individual objects may be authenticated in association with creation of the aggregate physical object. In some examples, the authentication may be by capturing image data from the bottle of wine, a chip, etc., forming a digital fingerprint, and so on, but this is not required. Any scheme for authenticating the bottle of wine may be utilized, in some embodiments. In block 710, the database system may retain an indication of authentication of the individual physical objects and/or metadata. In some examples, blocks 702-710 may include the database system performing the process shown in FIG. 1A for the individual objects and the aggregate physical object.

At a different time and/or location (for example at a next location in a supply chain) a target physical object may be obtained. In block 720, the database system may query the database for a matching record. In some embodiments, the database system may perform fingerprint matching 200 (FIG. 2) for the target physical object.

In diamond 722, the database system may determine whether a record of the aggregate physical object is returned responsive to the query. If the record of the aggregate physical object is returned, then in block 724 the database system may update the database system to reflect that data of the target object was matched, which may be similar to block 214 (FIG. 2) in some examples. The database system may retain an additional indication of authentication (e.g., an indication of re-authentication) of the individual objects and/or metadata (from the authentication of the aggregate physical object). In the case that the record of the aggregate physical object is not returned, in block 726 the database system may update the database to reflect that data of the target object was not matched, which may be similar to block 212 (FIG. 2) in some examples.

Figure 8:
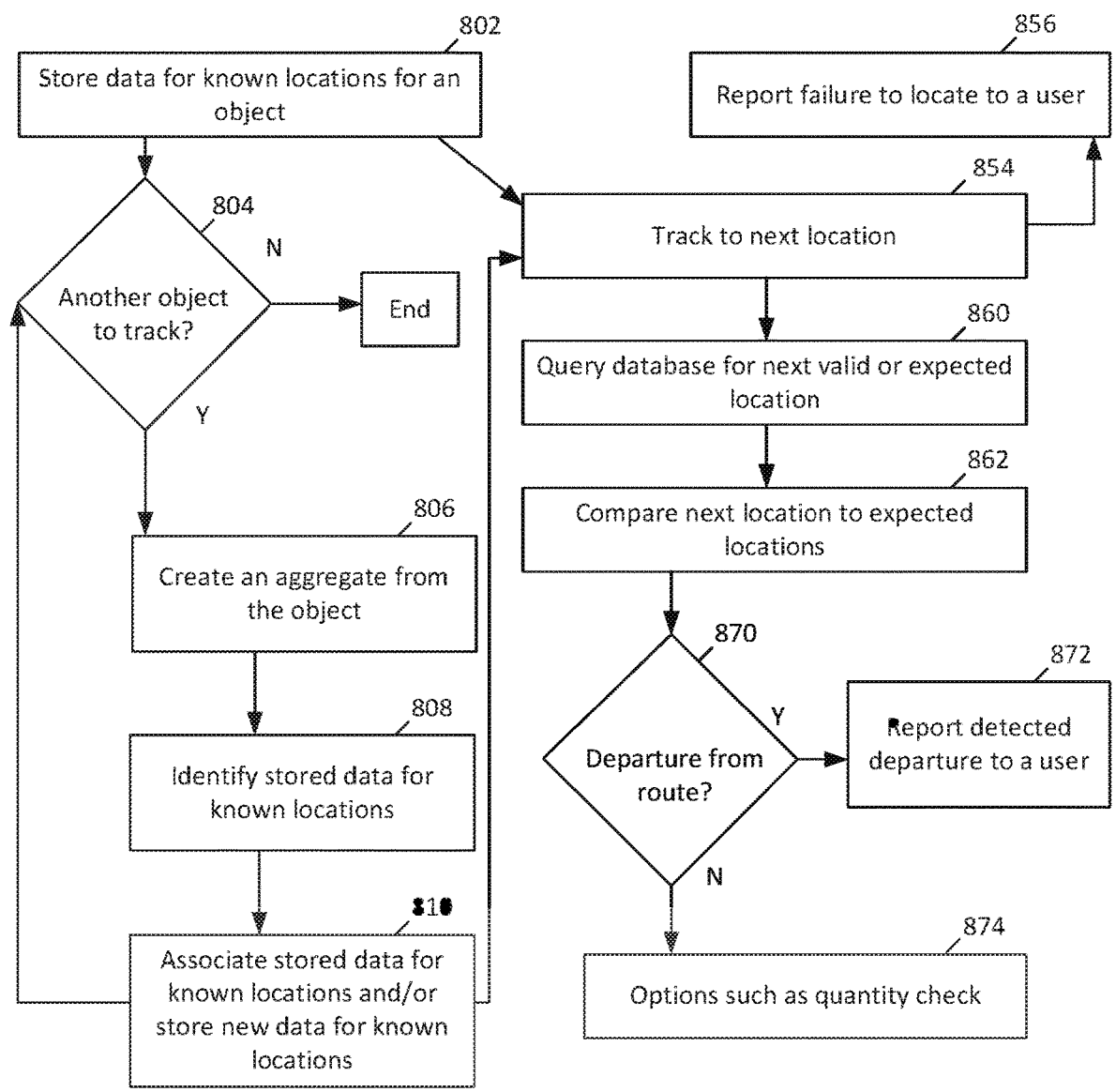
FIG. 8 illustrates a process of tracking objects and aggregates thereof.

FIG. 8 illustrates a process 800 of tracking objects and aggregates thereof. An object may be tracked along an initial leg of a supply chain, assembled into an aggregate, and then the aggregate may be tracked along another leg of the supply chain.

In block 802, the database system may store data for known locations for an object. This may be similar to block 502 of FIG. 5. The object may be an individual object, such as a wine bottle or chip, that is to be used to create an aggregate object, such as a wine case, a shipping contain for wine cases, a processing card, etc. The database system may perform blocks 854, 860, 862, 870, 872, 874, and 856, which may be similar to blocks/diamonds 504, 510, 512, 520, 522, 524, and 506, respectively.

In diamond 804, the database system may determine whether another object is to be tracked. If another object is to be tracked, in block 806 an aggregate may be created from the object (wine may be loaded into a case, a chip may be installed on a card, etc.). In block 808, the database system may identify stored data for known locations for the aggregate. In some examples, this may include accessing data stored for the individual object, in some cases. In block 810, the database system may associate the stored data and/or store new data (e.g., data created for the aggregate) for known locations of the aggregate. Tracking for the aggregate may be performed as indicated by the return to block 854. Also, the wine case may be packaged into another aggregate (such as a shipping container) as indicated by the return to diamond 804.

Example Embodiments

Example A-1 is a method of: authenticating a physical object of a plurality of physical objects that together form an aggregate physical object, wherein the aggregate physical object comprises either an intermediate aggregate physical object from which said physical object is to be later separated or a final aggregate physical object; storing in a database system relationship information reflecting a relationship between the aggregate physical object and the plurality of physical objects; attempting to authenticate a target physical object; responsive to matching the target physical object to the aggregate physical object based on the attempt to authenticate the physical target: identifying in the database system a database record corresponding to the aggregate physical object; storing in the database record authentication data reflecting the match between the target physical object and the aggregate physical object; and storing an indication of a re-authentication of the physical object in the database system based on the relationship information.

Example A-2 may include the subject matter of example A-1 (and/or any other example herein), wherein authenticating the physical object comprises: acquiring digital image data of an image of at least a portion of the physical object; analyzing the digital image data to form a digital fingerprint, wherein the digital fingerprint is responsive to natural structure of the physical object; and storing the digital fingerprint in the database system.

Example A3 may include the subject matter of example A-1 (and/or any other example herein), wherein attempting to authenticate the target physical object comprises: acquiring first digital image data of an image of at least a portion of the aggregate physical object; analyzing the first digital image data to form a first digital fingerprint, wherein the first digital fingerprint is responsive to natural structure of the aggregate physical object; storing the first digital fingerprint in the database record; subsequent to storing the first digital fingerprint in the database record, acquiring second digital image data of an image of at least a portion of the target physical object; extracting features from the second digital image data to form a second digital fingerprint; and querying the database system to seek a matching record based on the second digital fingerprint.

Example A-4 may include the subject matter of example A-3 (and/or any other example herein), wherein attempting to authenticate the target physical object further comprises: in the case that the database record is returned responsive to the querying, updating the database record with an indication that the second digital fingerprint was matched to the database record.

Example A-5 may include the subject matter of example A-1 (and/or any other example herein), further comprising storing the indication in a different database record of the database system, wherein the different database record is linked to the database record.

Example A-6 may include the subject matter of example A-1 (and/or any other example herein), wherein the plurality of physical objects comprise bottles of wine, and the aggregate physical object comprises a case containing the bottles of wine.

Example A-7 may include the subject matter of example A-1 (and/or any other example herein), wherein the plurality of physical objects comprise first bottles of wine, second bottles of wine, a first case for the first bottles of wine, a second case for the second bottles of wine, and a shipping container for the first and second cases; and wherein the aggregate physical object comprises the shipping container including the first and second cases each including the first bottles of wine and the second bottles of wine, respectively.

Example A-8 may include the subject matter of example A-7 (and/or any other example herein), wherein the physical object comprises a single one of the bottles of wine.

Example A-9 may include the subject matter of example A-7 (and/or any other example herein), wherein the physical object comprises a single one of the cases.

Example A-10 may include the subject matter of example A-10 (and/or any other example herein), wherein the plurality of physical objects comprises a microchip and a printed circuit board, and the aggregate physical object comprises a processing card, wherein the microchip is installed on a printed circuit board of the processing card.

Example A-11 may include the subject matter of example A-3 (and/or any other example herein), further comprising selecting the portion of the aggregate physical object to correspond with a portion of the intermediate aggregate physical object that is to be opened or manipulated to separate the physical object from the intermediate aggregate.

Example A-12 may include the subject matter of example A-3 (and/or any other example herein), further comprising repeating said authentication of the physical object in association with separating the physical object from the intermediate aggregate.

Example A-13 may include the subject matter of example A-1 (and/or any other example herein), further comprising for the physical object, defining an expected itinerary along a supply chain; tracking the aggregate physical object along the supply chain to form a portion of an actual itinerary of the physical object in the database system; querying the database system to detect a departure of the actual itinerary from the expected itinerary; and reporting the detected departure to a user.

Example A-14 may include the subject matter of example A-13 (and/or any other example herein), wherein the departure comprises a failure to locate the aggregate physical object at an expected location along the expected itinerary.

Example A-15 may include the subject matter of example A-13 (and/or any other example herein), wherein the departure comprises locating either the aggregate physical object or one of the plurality of physical objects at a location that is not consistent with the expected itinerary.

Example A-16 may include the subject matter of example A-1 (and/or any other example herein), further comprising obtaining additional data for the aggregate physical object and storing information about the additional data in the database record.

Example A-17 may include the subject matter of example A-16 (and/or any other example herein), wherein the additional data comprises temperature data, acceleration data, humidity data, pressure data, or another measurement.

Example A-18 may include the subject matter of example A-16 (and/or any other example herein), wherein the additional data comprises location data.

Example A-19 may include the subject matter of example A-16 (and/or any other example herein), wherein the additional data comprises chain of ownership data.

Example A-20 may include the subject matter of example A-3 (and/or any other example herein), wherein the digital fingerprint does not rely upon or require any labels, tags, integrated materials, unique identification characters, codes or other items that were added to the physical object specifically for the purpose of identification.

Example A-21 may include the subject matter of example A-1 (and/or any other example herein), wherein the authenticating is associated with creation of the aggregate physical object.

Example A-22 is a database system, wherein one or more processors of the database system are configured to perform the steps of any one of examples A-1 through A-21.

Example A-23 may include the subject matter of example A-22 (and/or any other example herein), wherein a first one of the one or more processors operates in a mobile device of the database system, and wherein the first processor is configured to perform the steps of A-2 and A-3, or any of the other example of examples A-1 through A-21 (and/or any other example herein).

Example A-24 is one or more memory storing instructions to be executed by one or more processors, wherein the instructions when executed perform operations corresponding to the steps of any of the examples A-1 through A-21 (and/or any other example herein).

Example A-25 may include the subject matter of example A-24 (and/or any other example herein), wherein at least a portion of the one or more processors comprises a processor of a mobile device.

Personal History in Track and Trace System

It may be of great interest or importance to an entity (a manufacturer, an ultimate consumer of an item, a regulatory body, or the like) to know an item's history. Some embodiments of a track and trace system may enable ascertainment that the item being authenticated at some point in the distribution process is indeed the item that was produced. This may address important need of a manufacturer, a consumer, etc.: providing knowledge that the consumed item is the item that was produced. Repeated authentication and/or data collection may be enforced throughout the supply chain by a manufacturer, a consumer, etc. An airline may, for example, require its manufacturers to digitally fingerprint an item for later authentication and also require each intermediate distributor to do the same until the part is ultimately installed on an airplane. Such requirements are not required for creating a personal history for an item, but they may be synergistic with creating a personal history for an item.

In some applications, simply knowing that an item is the original is not enough (e.g., the life history of the item may be critical as well). Items such as food, wine, computer chips, etc., may require being kept within a particular temperature range to be useful and/or retain their full value at their ultimate point of consumption. A wine that has been exposed to tropic heat, for example, has lost its value and it is of little consolation that the consumer knows the ruined wine is still in its original bottle.

There are many items, wine important among them, that are part of a ceremonial or almost ritual process. Both collectors of wine and consumers of wine want to know where the wine has been, who has owned it, and how it has been maintained. A rich pedigree adds to the enjoyment of a good bottle of wine. Some embodiments disclosed herein may allow that pedigree to be presented to the consumer by, say, the sommelier as part of the pouring process.

Some embodiments may establish and record the personal history of an item from its point of manufacture/creation (or point of establishment of preservation of a level of authenticity of a physical object) to its point of consumption.

In the process of tracking items using embodiments disclosed herein, the item and/or an intermediate or final aggregate item that includes the item may be digitally fingerprinted many times. A personal history for the item(s) may be established by tying that digital fingerprinting to metadata about the item(s). A part, such as an electronic apparatus, which is not subjectable to great acceleration without risk of damage, may have an accelerometer attached prior to shipment and a method of reading the history of shock loads experienced by the item provided at the point of authentication. At some or all points of authentication and/or data collection during track and trace of the item, along with collecting and comparing digital fingerprints, the acceleration history of the item may be read to create metadata that may be tied to track and trace record(s) for the item(s).

Knowing that such tracking is to be performed may provide incentive for manufacturers to include items (such as a component that is not subjectable to great acceleration without risk of damage) with their product (since when coupled with a track and trace system it can be established which distributor (for example) dropped the item, causing it to experience out-of-tolerance acceleration).

Among the data that might be acquired and added to the tracking record are GPS (global positioning system) or other location information, chain of ownership, acceleration, temperature, point of assembly or division (e.g. where a case of medicine was broken into individual packages or a product was assembled from its component parts), or the like, or combinations thereof. Any type of process for reading this information may be used, such as RFID (radio frequency identification) systems that, when queried, read out the history. For some data, manual entry may be sufficient (e.g. chain of ownership) alone or in combination with reading by electronic systems such as RFID based systems. Some embodiments may include track and trace capabilities to create the metadata records for preserving such information, as well as access capabilities enabling the metadata records to later be used.

As mentioned above, personal history may not be limited to the item itself, but may also include "parentage". For example, a case of wine may have been tracked and every bottle inside may have been digitally fingerprinted at manufacture. The same may be true for many other items, including packages of pharmaceuticals. Up to the point where the intermediate aggregate item (e.g., the case of wine) is opened, every item inside the intermediate aggregate item has the same personal history. At the point where the intermediate aggregate item is opened and the items thereof (e.g., the bottles of wine) distributed individually, each item separable from the intermediate aggregate item (e.g., a bottle of wine, a pill bottle, an individual part etc.) may acquire by inheritance the history of its "parent", namely the intermediate aggregate item (e.g., the case of wine) from which it came. Thereafter, the separate items may have their own history.

Some embodiments to create a personal history for an item may operate in a same system of an embodiment utilizing multi-level authentication. Creating a personal history may include establishing a history of individual items and of the different levels of packaging those items are, at one point or another in the item's life cycle, transported in. It is in view that items may, for example, be packaged into intermediate aggregate items (such as cases of wine) at the point of manufacture and later further transported individually. Conversely, it is also in view that multiple items may be aggregated into a single shipment or assembled into a product and thereafter (for a while or until final consumption) shipped as an aggregate.

In some systems, general information may be available for batches of an item but not for individual units. For example, batch numbers may be used to track, say, pharmaceutical aggregates. Similarly, for wine, information may be available for wine for the vineyard, type of grape, and vintage, but not for each bottle. In the case of wine, people sell wine notes concerning the vineyards, grape types, and vintages for the wine, but the only knowledge of a particular bottle comes from a bottle that has, by definition, been consumed. Some embodiments disclosed herein may allow information to be gathered on each individual bottle and traced through the entire lifespan of that bottle. Some embodiments may realize both item-level tracking and creation of item-level histories.

Figure 9:
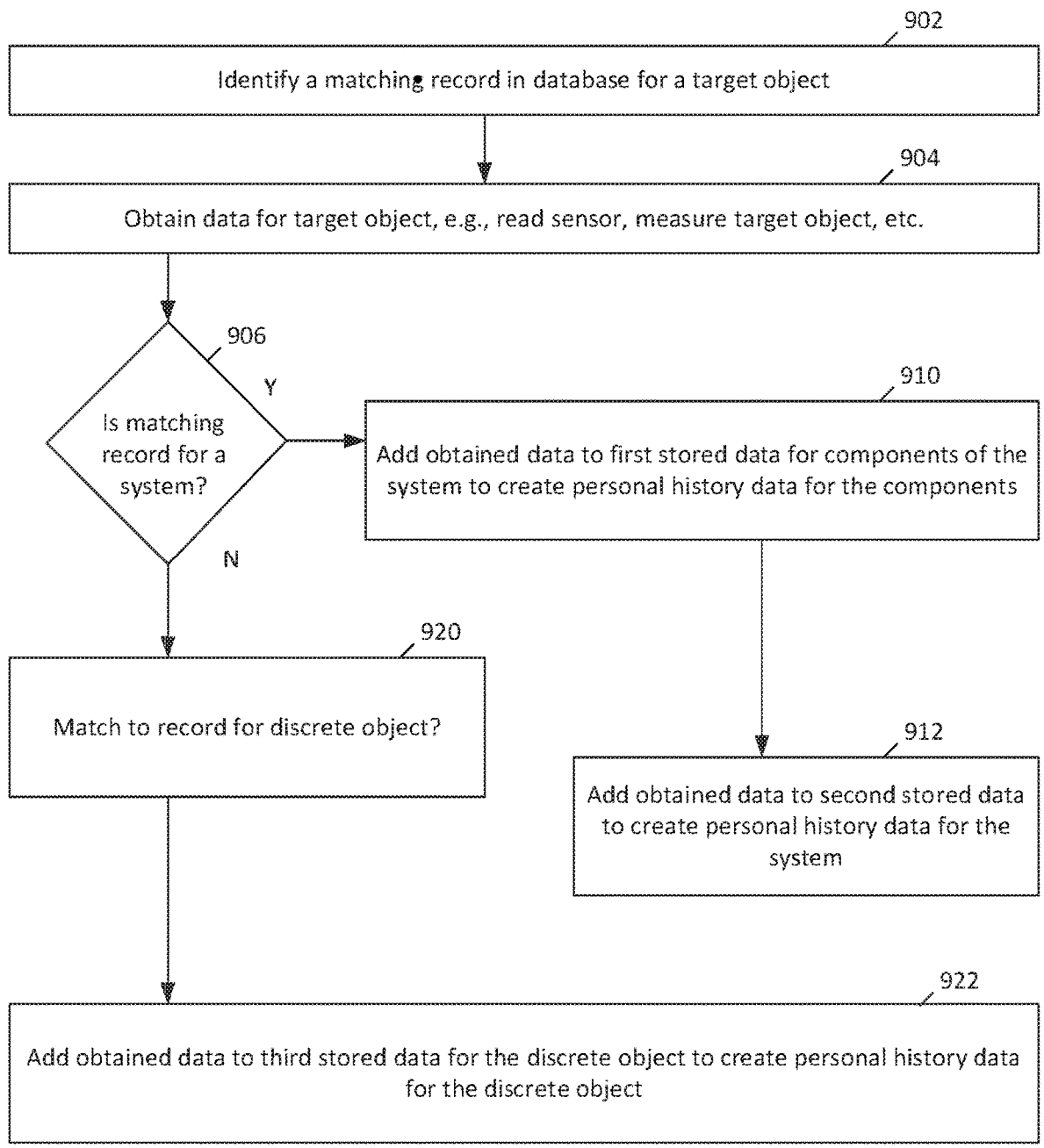
FIG. 9 illustrates a process of creating a personal history for components of a system, such as chips of a processing card.

FIG. 9 illustrates a process 900 of creating a personal history for components of a system, such as chips of a processing card.

In block 902, a database system (such as the database system of FIG. 4) may identify a matching record in a database for a target object. In some examples, this may be similar to process 200 (FIG. 2). In block 904, data for the target object may be obtained. For example, a sensor of the target object may be read, the target object may be measured, etc.

In diamond 906 the database system may determine whether a matching record is for a system. If the matching record is for a system, the database system in block 910 may add the obtained data to first stored data for components of the system to create personal history data for the components. The database system may also add the obtained data to second stored data to create personal history data for the system in block 912.

If the matching record is not for a system in diamond 906 and the match is to a record for a discrete object (block 920), then in block 922 the database system may add the obtained data to third stored data for the discrete object to create personal history data for the discrete object.

Figure 10:
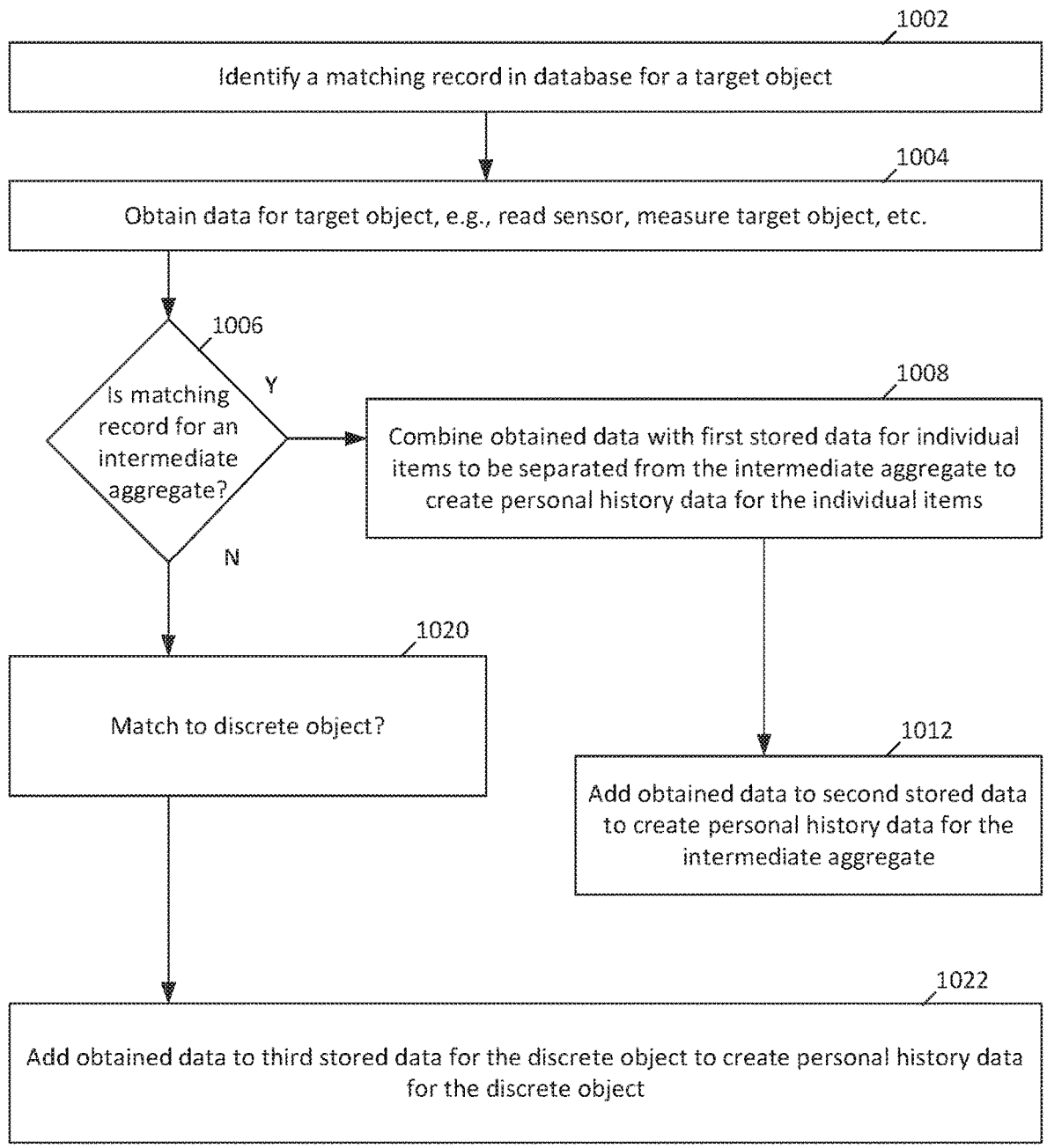
FIG. 10 illustrates a process of creating a personal history for objects of a supply chain aggregation, such as wine bottles of a wine case and/or shipping container.

FIG. 10 illustrates a process 1000 of creating a personal history for objects of a supply chain aggregation, such as wine bottles of a wine case and/or shipping container.

In block 1002, a database system (such as the database system of FIG. 4) may identify a matching record in a database for a target object. In some examples, this may be similar to process 200 (FIG. 2). In block 1004, data for the target object may be obtained. For example, a sensor of the target object may be read, the target object may be measured, etc.

In diamond 1006 the database system may determine whether a matching record is for an intermediate aggregate (such as a case of wine where the wine is to be later separated from the case). If the matching record is for an intermediate aggregate, the database system in block 1008 may add the obtained data to first stored data for individual items to be separated from the intermediate aggregate to create personal history data for the individual items. The database system may also add the obtained data to second stored data to create personal history data for the intermediate aggregate in block 1012.

If the matching record is not for a system in diamond 1006 and the match is to a record for a discrete object (block 1020), then in block 1022 the database system may add the obtained data to third stored data for the discrete object to create personal history data for the discrete object.

Example Embodiments

Example B-1 is method, comprising: acquiring first digital image data of an image of at least a portion of a physical object; analyzing the first image data to form a first digital fingerprint of the physical object, wherein the digital fingerprint is responsive to natural structure of the physical object; storing the digital fingerprint in a database record of a database system; subsequent to storing the digital fingerprint in the database record, identifying first information corresponding to a target physical object, wherein identifying the first information corresponding to the target physical object includes acquiring second digital image data of an image of at least a portion of the target physical object; identifying second information corresponding to the target physical object; extracting features from the second digital image data to form a second digital fingerprint; querying the database system to seek a matching record based on the second digital fingerprint in the case that a matching record is returned responsive to the querying, updating the matching record with an indication that the second digital fingerprint was matched to it and updating history data of said matching record based on said second information.

Example B-2 may include the subject matter of example B-1 (and/or any other example herein), wherein said second information comprises a measurement of a selected metric associated with the target physical object.

Example B-3 may include the subject matter of example B-2 (and/or any other example herein), wherein the second information comprises a temperature value or a measurement generated by an accelerometer.

Example B-4 may include the subject matter of example B-1 (and/or any other example herein), wherein the second information comprises location information.

Example B-5 may include the subject matter of example B-4 (and/or any other example herein), wherein the location information comprises GPS (global positioning system) of a location of the target physical object at a time associated with the acquisition of the second digital image data.

Example B-6 may include the subject matter of example B-1 (and/or any other example herein), wherein the second information comprises chain of ownership information.

Example B-7 may include the subject matter of example B-1 (and/or any other example herein), wherein the second information comprises information about a point of assembly of plural individual objects to form the target physical object or a point of division of the target physical object to separate an individual object from the target physical object.

Example B-8 may include the subject matter of example B-1 (and/or any other example herein), wherein the second information comprises a plurality of measurements obtained over time.

Example B-9 may include the subject matter of example B-1 (and/or any other example herein), wherein identifying the second information comprises reading sensor data of a sensor coupled to the target physical object.

Example B-10 may include the subject matter of example B-1 (and/or any other example herein), further comprising: securely associating a sensor and the physical object; obtaining a measurement of the physical object using the sensor; storing a value corresponding to the measurement in the digital fingerprint in the database record; and controlling the sensor to cause the sensor to obtain additional measurements of the physical object periodically.

Example B-11 may include the subject matter of example B-10 (and/or any other example herein), wherein the second information comprises data generated by the sensor responsive to periodically obtaining the additional measurements.

Example B-12 may include the subject matter of example B-1 (and/or any other example herein), wherein the digital fingerprint does not rely upon or require any labels, tags, integrated materials, unique identification characters, codes or other items that were added to the physical object specifically for the purpose of identification.

Example B-13 may include the subject matter of example B-1 (and/or any other example herein), further comprising: in the case that a matching record is not returned; updating the matching record with an indication that the second digital fingerprint was not matched to it.

Example B-14 may include the subject matter of example B-1 (and/or any other example herein), wherein the matching recording comprises the database record or a record of an intermediate aggregate physical object from which said physical object is to be later separated or a final aggregate physical object that includes the physical object.

Example B-15 may include the subject matter of example B-14 (and/or any other example herein), further comprising updating history data of the record of the intermediate aggregate physical object or the final aggregate physical object based on the second information.

Example B-16 is a method, comprising: acquiring first information corresponding to a physical object (e.g., obtaining data from an object such as a label or RF ID tag added to a physical object for the purpose of identification of the physical object); identifying first authentication data based on the first information (e.g., recognize a value in the information from, say, the label or the RF ID tag, the value to be used for authentication); storing the first authentication data in a database record of a database system; subsequent to storing the first authentication data in the database record, acquiring second information corresponding to a target physical object and identifying second authentication data based on the second information (e.g., identifying a value in a label, RF ID tag, etc.); identifying third information corresponding to the target physical object; querying the database system to seek a matching record based on the second authentication data; in the case that a matching record is returned responsive to the querying, updating the matching record with an indication that the second authentication data was matched to it and updating history data of said matching record based on said third information.

Example B-17 may include the subject matter of example B-16 (and/or any other example herein), wherein the third information comprises at least one of a measurement of a selected metric associated with the target physical object, a temperature value or a measurement generated by an accelerometer, first location information, second location information comprising comprises GPS (global positioning system) of a location of the target physical object at a time associated with the acquisition of the second information, chain of ownership information, information about a point of assembly of plural individual objects to form the target physical object or a point of division of the target physical object to separate an individual object from the target physical object, a first plurality of measurements obtained over time, or a second plurality of measurements obtained over time by reading sensor data of a sensor coupled to the target physical object.

Example B-18 may include the subject matter of example B-17 (and/or any other example herein), further comprising: securely associating a sensor and the physical object; obtaining a measurement of the physical object using the sensor; storing a value corresponding to the measurement in the database record and/or in the first authentication data in the database record; and controlling the sensor to cause the sensor to obtain additional measurements of the physical object periodically.

Example B-19 may include the subject matter of example B-18 (and/or any other example herein), wherein the third information comprises data generated by the sensor responsive to periodically obtaining the additional measurements.

Example B-20 may include the subject matter of example B-16 (and/or any other example herein), wherein the first authentication information does not rely upon or require any labels, tags, integrated materials, unique identification characters, codes or other items that were added to the physical object specifically for the purpose of identification.

Example B-21 may include the subject matter of example B-16 (and/or any other example herein), further comprising: in the case that a matching record is not returned; updating the matching record with an indication that the second authentication data was not matched to it.

Example B-22 may include the subject matter of example B-16 (and/or any other example herein), wherein the matching recording comprises the database record or a record of an intermediate aggregate physical object from which said physical object is to be later separated or a final aggregate physical object that includes the physical object.

Example B-23 may include the subject matter of example B-22 (and/or any other example herein), further comprising updating history data of the record of the intermediate aggregate physical object or the final aggregate physical object based on the third information.

Example B-24 is database system, wherein one or more processors of the database system are configured to perform the steps of any one of examples B-1 through B-23 (and/or any other example herein).

Example B-25 may include the subject matter of example B-24 (and/or any other example herein), wherein a first one of the one or more processors operates in a mobile device of the database system, and wherein the first processor is configured to perform the steps of B16, or any of the other example of examples B1-B23 (and/or any other example herein).

Example B-26 is one or more memory storing instructions to be executed by one or more processors, wherein the instructions when executed perform operations corresponding to the steps of any of the examples B1 through B23 (and/or any other example herein).

Example B-27 may include the subject matter of example B-26 (and/or any other example herein), wherein at least a portion of the one or more processors comprises a processor of a mobile device.

Preserving a Level of Confidence of Authenticity of an Object

An item may be digitally fingerprinted at the point of manufacture and tracked with repeated digital fingerprinting (of the item or an intermediate or final aggregate) and database comparisons until ultimate use of the item. Preservation of the level of confidence of authenticity may apply to items already in existence prior to the ability to track them by using digital fingerprinting or a similar scheme. These items may have been created and, for example, bar coded or had some security device added to it (such as a security device presumed to reduce counterfeiting), or they may currently be in the hands of an expert who validates the item as legitimate (such as in the case of fine art or old wine). Other examples may include currently-valid passports and other already-existing identity documents that have some existing level of trust.

Some embodiments utilizing preservation of the level of confidence of authenticity may use digital fingerprinting to preserve the level of provenance established by an authentication framework (whether expert, machine-based, or a combination thereof) that is current when the item is about to be digitally fingerprinted.

Consider a wine collector who hires an expert authenticator to certify that the items in his collection are what they claim to be. It may not be possible to establish without question the original provenance of the item (e.g. tracing back to a point of manufacture). Similarly, the level of confidence of authenticity currently present may not have been directly established at the point of manufacture and/or using digital fingerprinting. The best that can be done at this point is to digitally fingerprint the object and use the techniques presented here to preserve that confidence going forward. Some embodiments may preserve this level of confidence of authenticity by tying the digital fingerprint to the metadata about the item. In some examples, the metadata may include a certification of authenticity by the expert (or information thereof).

Figure 11:
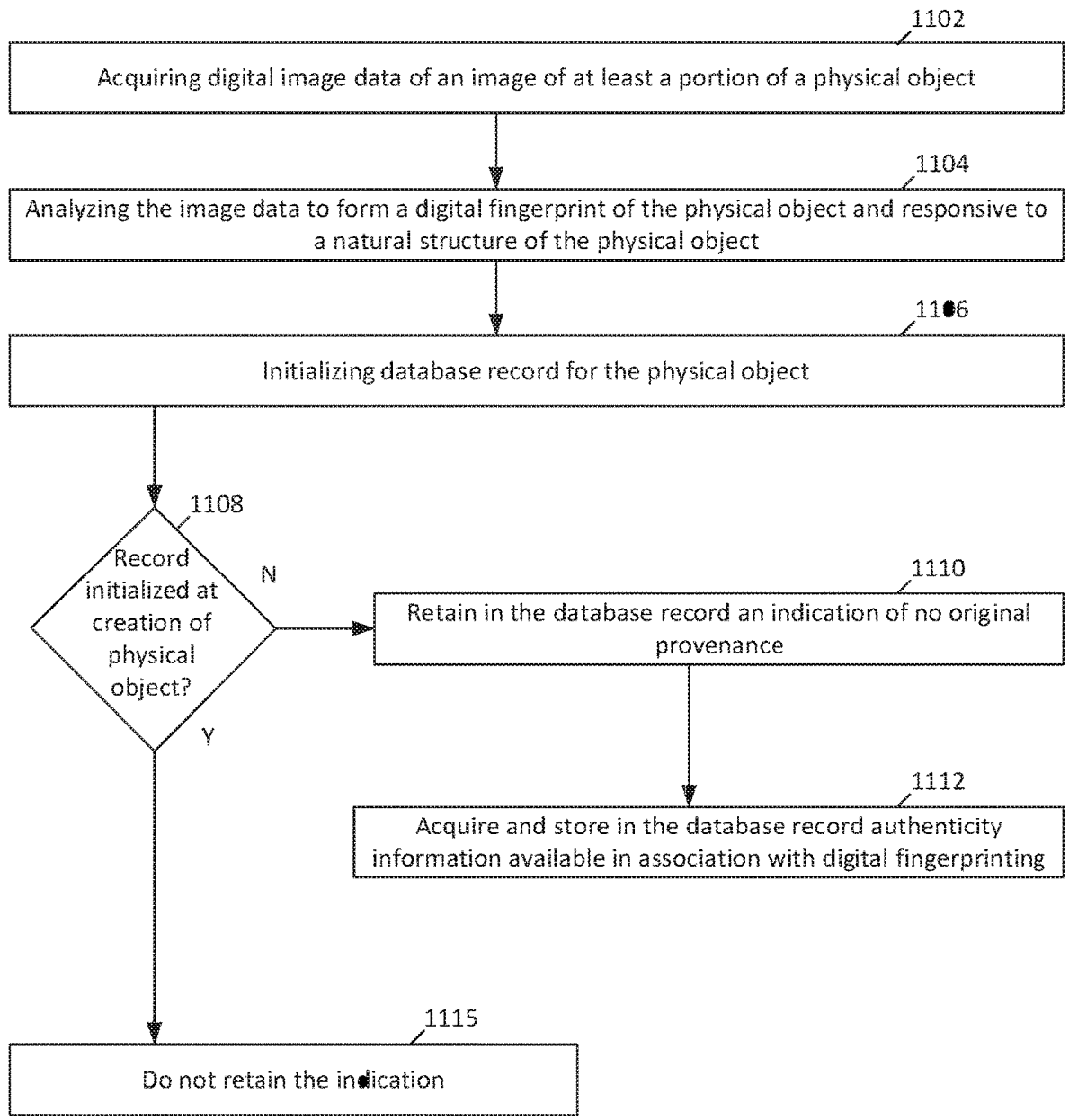
FIG. 11 illustrates a process of preserving a level of confidence of authenticity of a physical object.

FIG. 11 illustrates a process 1100 of preserving a level of confidence of authenticity of a physical object.

Blocks 1102-1106 may be similar to operations of the process described with respect to FIG. 1A. In diamond 1108, a database system (such as the database system of FIG. 4) may determine whether the record is initialized at creation of the physical object (e.g., at manufacture in the case of manufactured goods). If the record is not initialized at creation of the physical object, then in block 1110 the database system may retain in the database record an indication of no original provenance. The indication of no original provenance may be a binary datum (such as a flag) in some examples The database system in block 1112 may acquire and store in the database record authenticity information available in association with digital fingerprinting. The authenticity information may include an indication of authenticity, and metadata about the authenticity, such as information about a person that determined authenticity, how authenticity was determined, when authenticity was determined, where authenticity was determined, or the like, or combinations thereof. In some examples, the authenticity information may include a portion (e.g., the entire or some of) an electronic certificate of authenticity. The authenticity information may include security information, such as a digital signature on the electronic certificate of authenticity.

If the record is initialized at creation of the physical object, the database system may not retain the indication (block 1115). The database system may of course retain information of the digital fingerprinting (not shown).

Figure 12:
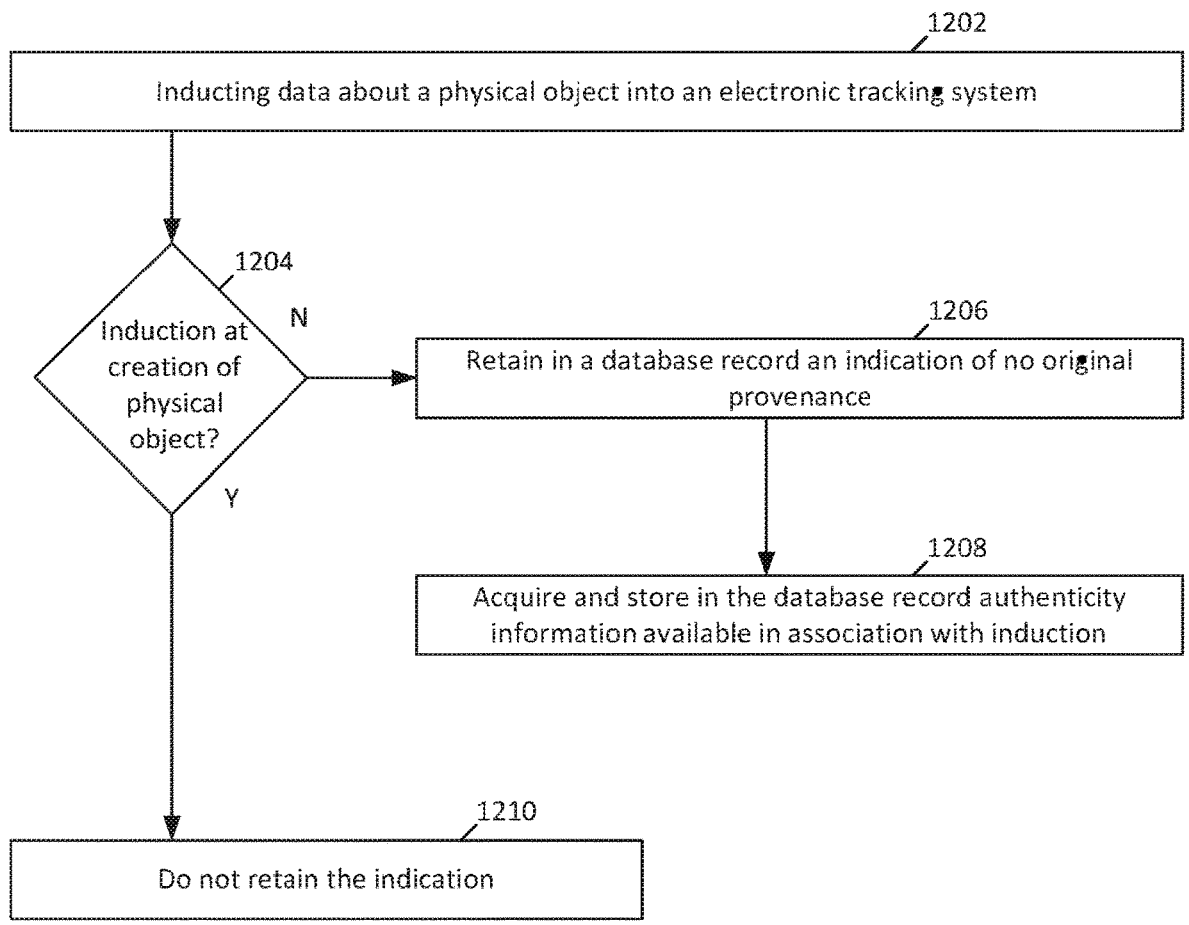
FIG. 12 illustrates a process of preserving a level of confidence of authenticity of a physical object on induction into a tracking system.

FIG. 12 illustrates a process 1200 of preserving a level of confidence of authenticity of a physical object on induction into a tracking system. Data about a physical object may be inducted into an electronic tracking system in block 1202. A database system of the electronic tracking system may determine whether the data is inducted at creation of the physical object in diamond 1204. If the induction is not at creation of the physical object, then in block 1206 the database system may retain in a database record an indication of no original provenance, which may be similar to block 1110 (FIG. 11). In block 1208, the database system may acquire and store in the database record authenticity information available in association with induction, which may be similar to block 1112 (FIG. 11). If induction is at creation of the physical object, then in block 1210 the database system may not retain the indication (block 1210, which may be similar to block 1115 (FIG. 11)).

Example Embodiments

Example C-1 is a method, comprising: acquiring digital image data of an image of at least a portion of a physical object; analyzing the image data to form a digital fingerprint of the physical object for an authentication of the physical object, wherein the digital fingerprint is responsive to a natural structure of the physical object; initializing a database record associated with the physical object responsive to forming the digital fingerprint; determining whether the digital fingerprint corresponds to original provenance for the physical object; in response to determining that the digital fingerprint does not correspond to original provenance for the physical object, acquire and store in the database record first data including authenticity information available in association with formation of the digital fingerprint; in response to determining that the digital fingerprint does correspond to original provenance for the physical object, retaining second data in the database record.

Example C-2 may include the subject matter of example C-1 (and/or any other example herein), wherein the authenticity information includes an indication of a validation of authenticity and metadata for the validation.

Example C-3 may include the subject matter of example C-2 (and/or any other example herein), wherein the metadata includes information about a time of ascertainment of said validation.

Example C-4 may include the subject matter of example C-2 (and/or any other example herein), wherein the metadata includes information about a location of the physical object at a time of the validation.

Example C-5 may include the subject matter of example C-4 (and/or any other example herein), wherein the information about the location includes GPS (global positioning system) coordinates.

Example C-6 may include the subject matter of example C-2 (and/or any other example herein), wherein the metadata includes an indicator for a type of the validation, wherein the type is selected from machine-based and expert based types.

Example C-7 may include the subject matter of example C-2 (and/or any other example herein), wherein the metadata includes a certificate of authenticity.

Example C-8 may include the subject matter of example C-7 (and/or any other example herein), wherein the metadata includes a digital signature on the certificate of authenticity.

Example C-9 may include the subject matter of example C-2 (and/or any other example herein), wherein the metadata includes a source of a validation service corresponding to the validation.

Example C-10 may include the subject matter of example C-2 (and/or any other example herein), wherein the metadata specifies at least one of machine-based analysis, laboratory analysis, or microscopy.

Example C-11 may include the subject matter of example C-1 (and/or any other example herein), wherein the digital fingerprint does not rely upon or require any labels, tags, integrated materials, unique identification characters, codes or other items that were added to the physical object specifically for the purpose of identification.

Example C-12 may include the subject matter of example C-2 (and/or any other example herein), wherein the metadata includes a value taken from a label, tag, integrated material, unique identification character, code or other item present on the physical object in association with acquisition of the digital image data.

Example C-13 may include the subject matter of example C-12 (and/or any other example herein), wherein an edge of the label, tag, integrated material, unique identification character, code, or other item appears in the image and is represented by the digital image data.

Example C-14 may include the subject matter of example C-1 (and/or any other example herein), wherein an authentication process artifact from a label, tag, integrated material, unique identification character, code, or other item appears in the image and is represented by the digital image data.

Example C-15 may include the subject matter of example C-14 (and/or any other example herein), wherein the authentication process artifact comprises at least one of a inconsistency in a patina, wear markings, light bleach markings, or corrosion.

Example C-16 may include the subject matter of example C-1 (and/or any other example herein), wherein an anti-counterfeiting artifact referenced by an authentication certificate included in metadata of the first data appears in the image and is represented by the digital image data.

Example C-17 may include the subject matter of example C-16 (and/or any other example herein), wherein the anti-counterfeiting artifact comprises at least one of a inconsistency in a patina, wear markings, light bleach markings, or corrosion.

Example C-18 is a method, comprising: acquiring first information corresponding to a physical object; identifying first authentication data based on the first information; initialize a database record associated with the physical object responsive to identifying the first authentication data; determining whether the first authentication data corresponds to original provenance for the physical object; in response to determining that the first authentication data does not correspond to original provenance for the physical object, acquire and store in the database record first record data including authenticity information available in association with identification of the first authentication data; in response to determining that the first authentication data does correspond to original provenance for the physical object, retaining second record data in the database record.

Example C-19 may include the subject matter of example C-18 (and/or any other example herein), wherein the authenticity information includes an indication of a validation of authenticity and metadata for the validation.

Example C-20 may include the subject matter of example C-19 (and/or any other example herein), wherein the metadata includes information about a time of ascertainment of said validation.

Example C-21 may include the subject matter of example C-19 (and/or any other example herein), wherein the metadata includes information about a location of the physical object at a time of the validation.

Example C-22 may include the subject matter of example C-21 (and/or any other example herein), wherein the information about the location includes GPS (global positioning system) coordinates.

Example C-23 may include the subject matter of example C-19 (and/or any other example herein), wherein the metadata includes an indicator for a type of the validation, wherein the type is selected from machine-based and expert based types.

Example C-24 may include the subject matter of example C-19 (and/or any other example herein), wherein the metadata includes a certificate of authenticity.

Example C-25 may include the subject matter of example C-24 (and/or any other example herein), wherein the metadata includes a digital signature on the certificate of authenticity.

Example C-26 may include the subject matter of example C-19 (and/or any other example herein), wherein the metadata includes a source of a validation service corresponding to the validation.

Example C-27 may include the subject matter of example C-19 (and/or any other example herein), wherein the metadata specifies at least one of machine-based analysis, laboratory analysis, or microscopy.

Example C-28 may include the subject matter of example C-18 (and/or any other example herein), wherein the first authentication data does not rely upon or require any labels, tags, integrated materials, unique identification characters, codes or other items that were added to the physical object specifically for the purpose of identification.

Example C-29 may include the subject matter of example C-19 (and/or any other example herein), wherein at least one of the metadata, the first information, or the first authentication data includes a value taken from a label, tag, integrated material, unique identification character, code or other item present on the physical object in association with acquisition of the digital image data.

Example C-30 is database system, wherein one or more processors of the database system are configured to perform the steps of any one of examples C-1 through C-29 (and/or any other example herein).

Example C-2 may include the subject matter of example C-30 (and/or any other example herein), wherein a first one of the one or more processors operates in a mobile device of the database system, and wherein the first processor is configured to perform the steps of C-18, or any of the other example of examples C1-C29 (and/or any other example herein).

Example C-32 is one or more memory storing instructions to be executed by one or more processors, wherein the instructions when executed perform operations corresponding to the steps of any of the examples C-1 through C-29 (and/or any other example herein).

Example C-33 may include the subject matter of example C-32 (and/or any other example herein), wherein at least a portion of the one or more processors comprises a processor of a mobile device.

Preserving Authentication Under Item Change

Some embodiments may include episodically updating a most current digital fingerprint to enable an object to be tracked even as it changes significantly. Some embodiments may include the creation of a history of the item including the modified digital fingerprints (which may be indicative of wear, oxidative damage, or other changes) and metadata such as the accelerative forces, temperature extremes the item has been subject to, humidity extremes the item has been subject to, pressure (e.g., atmospheric) the item has been subject to, or the like, or combinations thereof, so that a more complete history of the item can be assembled. Some embodiments include the generation and use of history metadata.

Many items do not change significantly from the time they are created to their ultimate consumption. This is particularly true where supply chains and product lifetimes are short. Under such circumstances, the changes that occur in the item while in the supply chain are essentially those of wear and tear from shipping, marking, and other modifications that occur as a side effect of the item's life cycle. However, for some items these changes may be sufficiently severe as to reduce the match between the authenticating digital fingerprint and the original one.

All items to some extent but particularly items that have long lifetimes can undergo significant changes that have nothing to do with wear and tear or transport. Parts can rust, wine bottle labels can corrode, credit card security regions can be abraded, etc. These changes are presumed to take place gradually (on a scale slower than over which re-authentication may be used).

Some items may change sufficiently from manufacturing to authentication for a digital fingerprint match to degrade significantly. Even though some digital fingerprinting may be quite resistant to changes that prevent matches of portions of the item, nevertheless cumulative changes eventually modify the item sufficiently that the digital fingerprint match may become uncertain or fail altogether. For long-lived items corrosion and other such changes similarly gradually alter the digital fingerprints that could be extracted from the item.

Some embodiments may repeatedly acquire digital fingerprints of an item, store them in a database in concert with all the metadata gathered at manufacture and whenever the item is authenticated (or otherwise made available for data collection) and also in concert with previously extracted digital fingerprints, and through this continual updating process accomplishing the goal of tracking the item with high confidence even in the presence of significant change. It is to be stressed that whether or not such changes are gradual or sudden, it is presumed that the item is digitally re-fingerprinted at the point where confidence in match between the current and the original digital fingerprint is still strong but deteriorating. The record of the item thus contains either a sequence of historical (and now-current) digital fingerprints, or simply the most recent one.

Wine may be bottled in a bottling plant associated with the vintner. After each bottle is filled and a cork inserted, the top of the bottle may be sealed with a foil capsule (hereinafter "the capsule"). A digital fingerprinting system may image the top of the capsule and record the digital fingerprints for later use in tracking and/or authenticating the bottle. Under normal circumstances, where little change is anticipated in the item, that is sufficient. For items such as wine, however, that may have a lifetime measured in decades (if not longer—the oldest extant bottle of wine is from the fourth century), or for items that may undergo continual, gradual wear and tear during transport, a process to preserve authentication under item change may be utilized.

Wine, particularly high-end wine, may change hands many times during its lifetime. The capsule (or label or whatever is being used for authentication or tracking) may age or get worn with time, eventually changing significantly. The bottle of wine may be re-authenticated multiple times during its lifetime, for instance the bottle of wine may be authenticated upon changing hands.

Besides re-authentication at transactions such as when the bottle of wine changes hands, scheduled re-authentication (e.g., periodically, say every year) may be used to preserve authentication under item change. The capsule (or appropriate part) may be imaged and the digital fingerprints extracted. The digital fingerprints may be compared to the recorded digital fingerprints in the database and the bottle of wine may be authenticated. At this point a newly-extracted digital fingerprints may be added to the database for any reason such as 1) they are added whenever the item changes hands as a matter of practice, 2) they are added on some work cycle, e.g. every year, 3) the match with the existing digital fingerprints is significantly less good than in previous authentications or when tested at creation, 4) because the authenticator observes degradation, or 5) for any other reason.

The newly added digital fingerprint may be included in the database record for that bottle of wine, along with when it was taken and other metadata as desired. Provided the deterioration in digital fingerprint match is not too severe, this system may preserve the provenance of the item even if it changes sufficiently so that without this system, it could no longer be authenticated.

Figure 13:
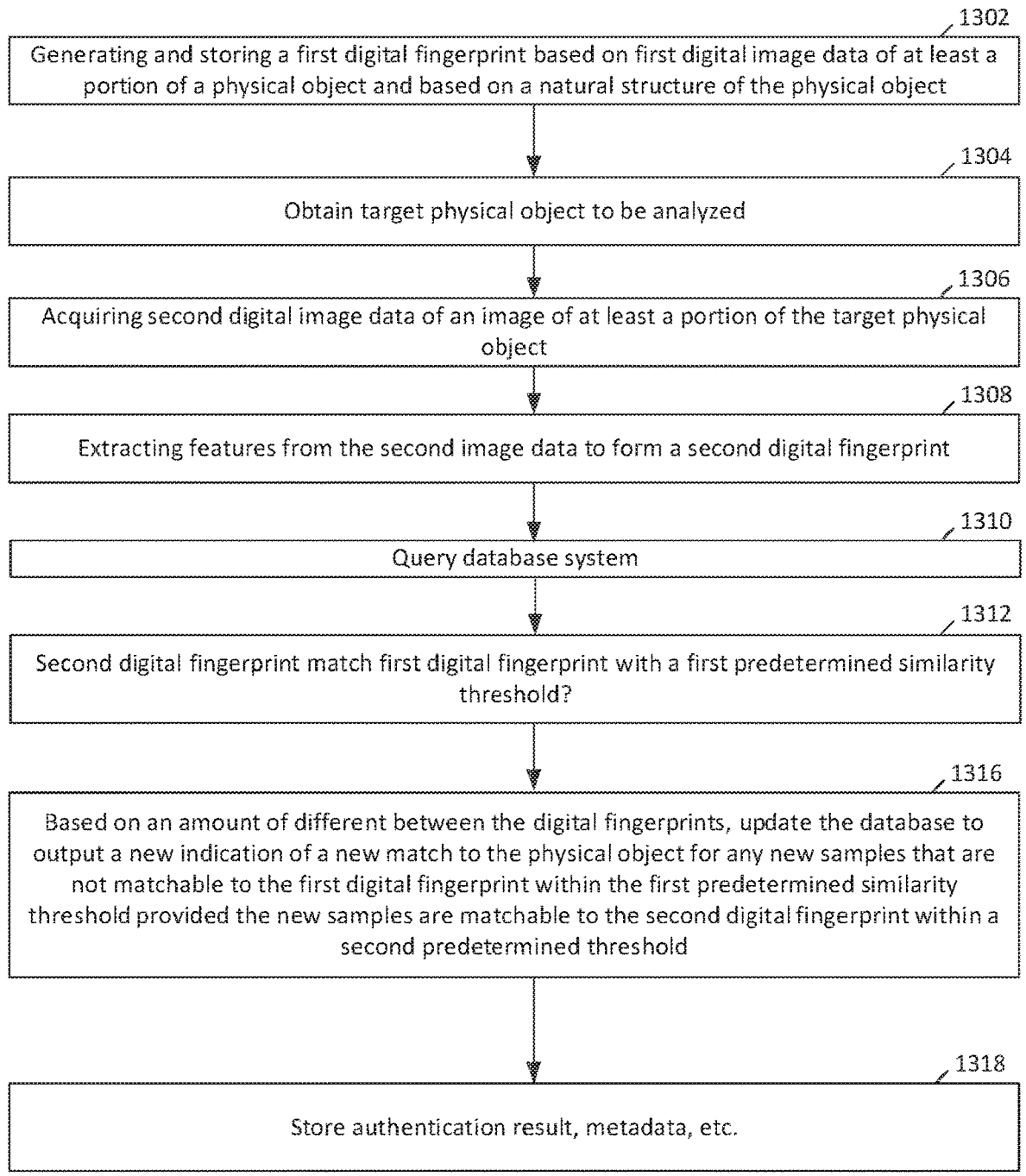
FIG. 13 illustrates a process of preserving authentication under item change.

FIG. 13 illustrates a process 1300 of preserving authentication under item change.

A database system (such as the database system of FIG. 4) may perform block 1302, which may be similar to the process of FIG. 1A in some examples. The database system may perform blocks 1304, 1306, 1308, 1310, and 1312, which may be similar to operations of process 200 of FIG. 2 in some examples.

In block 1316, based on an amount of difference between the digital fingerprints, the database system may update the database to output a new indication of a new match to the physical object for any new samples that are not matchable to the first digital fingerprint within the first predetermined similarity threshold provided the new samples are matchable to the second digital fingerprint with a second predetermined threshold. The database system may store an authentication result, metadata, etc. in block 1318.

FIG. 14 illustrates a process 1400 of classifying item change.

In block 1402, the database system may scan a physical object and capture data at intervals over time (e.g., as the physical object moves along a supply chain, as the physical item changes hands, at periodic intervals, or the like, or combinations thereof). In block 1404, the database system may store the captured image data.

In block 1405, the database system may generate a sequence of fingerprints based on at least some of the captured data. For instance, the process of FIG. 1A may be performed on the physical object at some or all of the times of data capture.

In block 1406, the database system may recognize incremental changes to a natural structure of a physical object attributable to at least one of wear from use over time, additional markings to the physical object over time, corrosion over time, or wear from transport. The incremental changes may be indicated by the sequence of digital fingerprints, and the database system may perform the recognition based on the sequence of digital fingerprints.

In block 1408, the database system may analyze the metadata to classify at least one of the incremental changes. In block 1410, the database system may store classification information in the database.

Example Embodiments

Example D-1 is a method, comprising: providing a database system to store a first digital fingerprint based on first digital image data of an image of at least a portion of a physical object, wherein the first digital fingerprint is responsive to a natural structure of the physical object; wherein the database system is configured to output an indication of a match to the physical object for any samples that are matchable to the first digital fingerprint within a first predetermined similarity threshold; acquiring second digital image data of an image of at least a portion of a target physical object; extracting features from the second image data to form a second digital fingerprint; querying the database system to seek a matching record based on the second digital fingerprint; based on an amount of difference between the first and second digital fingerprints, update the database system to output a new indication of a new match to the physical object for any new samples that are not matchable to the first digital fingerprint within said first predetermined similarity threshold provided the new samples are matchable to the second digital fingerprint within a second predetermined similarity threshold.

Example D-2 may include the subject matter of example D-1 (and/or any other example herein), wherein said updating further comprises: adding the second digital fingerprint to a database record for the physical object responsive to matching the second digital fingerprint to the first digital fingerprint.

Example D-3 may include the subject matter of example D-2 (and/or any other example herein), wherein the database system is arranged to, in response to identifying a third digital fingerprint, query the database system to seek a matching record based on the third digital fingerprint; and wherein query the database system to seek the matching record based on the third digital fingerprint comprises compare the third digital fingerprint to at least one of the first or second digital fingerprints.

Example D-4 may include the subject matter of example D-3 (and/or any other example herein), wherein compare the third digital fingerprint to at least one of the first or second digital fingerprints comprises comparing the third digital fingerprint to the second digital fingerprint before comparing the third digital fingerprint to the first digital fingerprint or conditionally comparing the third digital fingerprint to the first digital fingerprint based on the comparison of the second and third digital fingerprints.

Example D-5 may include the subject matter of example D-3 (and/or any other example herein), wherein compare the third digital fingerprint to at least one of the first or second digital fingerprints comprises compare the third digital fingerprint to selected digital fingerprints of all digital fingerprints of the database record.

Example D-6 may include the subject matter of example D-1 (and/or any other example herein), wherein said updating comprises: adding the second digital fingerprint to a database record for the physical object responsive to matching the second digital fingerprint to the first digital fingerprint, wherein responsive to the adding the database record comprises a sequence of digital fingerprints, wherein a most recent digital fingerprint of the stored sequence comprises the second digital fingerprint and a least recent digital fingerprint of the stored sequence comprises the first digital fingerprint or a less recent digital fingerprint; and performing a selection from the set based on an amount of difference between the first and second digital fingerprints; and retaining in the database system control information based on the selection, wherein said control information is to constrain next one or more comparisons of a third digital fingerprint of a next query to a subset of the digital fingerprints of the sequence or is to constrain a temporal order for performing a plurality of next comparisons of the third digital fingerprint to digital fingerprints of the sequence.

Example D-7 may include the subject matter of example D-1 (and/or any other example herein), wherein the second predetermined similarity threshold is different than the first predetermined similarity threshold.

Example D-8 may include the subject matter of example D-1 (and/or any other example herein), further comprising: identifying a third digital fingerprint, the third digital fingerprint similar to the second digital fingerprint within the second predetermined similarity threshold, the third digital fingerprint not similar to the first digital fingerprint within the first predetermined similarity threshold; identifying a sequence of digital fingerprints associated with the physical object, the sequence including at least the first, second, and third digital fingerprints; based on the sequence of digital fingerprints, recognizing incremental changes to the natural structure of the physical object attributable to at least one of wear from use over time, addition of markings to the physical object over time, corrosion over time, or wear from transport based on incremental changes; generating history data to characterize the changes responsive to said recognition; and causing the history data to be displayed on an electronic display.

Example D-9 may include the subject matter of example D-8 (and/or any other example herein), further comprising: identifying a sequence of metadata, wherein each metadata of the sequence of metadata is associated with a respective one of the digital fingerprints of the sequence of digital fingerprints; correlating at least one of the changes of wear from use over time, addition of markings to the physical object over time, corrosion over time, or wear from transport based on incremental changes based on the sequence of metadata; and storing a result of the correlation in the database system.

Example D-10 may include the subject matter of example D-9 (and/or any other example herein), wherein the metadata specifies locations of scans to generate the digital fingerprints of the sequence of digital fingerprints.

Example D-11 may include the subject matter of example D-9 (and/or any other example herein), further comprising: correlating the at least one of the changes to the natural structure to transport along a supply chain based on location data of the sequence of metadata; and displaying information about the correlation.

Example D-12 may include the subject matter of example D-9 (and/or any other example herein), further comprising: correlating the at least one of the changes to a time period based on time data of the sequence of metadata; wherein the correlation to at least one of wear from use over time, addition of markings to the physical object over time, corrosion over time, or wear from transport based on incremental changes is based on the correlation to the time period.

Example D-13 may include the subject matter of example D-8 (and/or any other example herein), wherein the corrosion comprises oxidative damage.

Example D-14 may include the subject matter of example D-8 (and/or any other example herein), wherein the wear over time comprises abrasion of a security region of the physical object.

Example D-15 may include the subject matter of example D-14 (and/or any other example herein), wherein the physical object comprises a credit card.

Example D-16 may include the subject matter of example D-8 (and/or any other example herein), wherein said recognition comprises detecting the addition of material to the physical object to mark the physical object based on comparing different digital fingerprints of the sequence of digital fingerprints.

Example D-17 may include the subject matter of example D-8 (and/or any other example herein), wherein said recognition comprises detecting the removal of material from the physical object to mark the physical object based on comparing different digital fingerprints of the sequence of digital fingerprints.

Example D-18 may include the subject matter of example D-1 (and/or any other example herein), further comprising storing the second digital fingerprint in the database record.

Example D-19 may include the subject matter of example D-18 (and/or any other example herein), further comprising retaining the first digital fingerprint responsive to updating the database system to provide a stored sequence of digital fingerprints associated with the digital object.

Example D-20 may include the subject matter of example D-1 (and/or any other example herein), wherein the physical object comprises a bottle of wine.

Example D-21 may include the subject matter of example D-20 (and/or any other example herein), wherein the portion of the physical object comprises a foil capsule of the bottle of wine.

Example D-22 may include the subject matter of example D-1 (and/or any other example herein), wherein updating the database record of the database system based on the result of the determination further comprising replacing the first digital fingerprint with the second digital fingerprint in the database record.

Example D-23 may include the subject matter of example D-8 (and/or any other example herein), further comprising: identifying a sequence of metadata; wherein each metadata of the sequence of metadata is associated with a respective one of the digital fingerprints of the sequence of digital fingerprints, each one of the digital fingerprints of the sequence and associated metadata formed and collected, respectively, at a different location of a plurality of locations along a physical path of travel of the physical object; correlating the at least one of the changes to the natural structure to a subset of the physical path based on location data of the sequence of metadata; and displaying information about the correlation.

Example D-24 may include the subject matter of example D-23 (and/or any other example herein), wherein the physical path of travel coincides with a supply chain.

Example D-25 is a database system, wherein one or more processors of the database system are configured to perform the steps of any one of examples D-1 through D-24 (and/or any other example herein).

Example D-26 may include the subject matter of example D-25 (and/or any other example herein), wherein a first one of the one or more processors operates in a mobile device of the database system, and wherein the first processor is configured to perform the steps of D-1, or any of the other example of examples D-1 through D-24 (and/or any other example herein).

Example D-27 is one or more memory storing instructions to be executed by one or more processors, wherein the instructions when executed perform operations corresponding to the steps of any of the examples D1 through D-24 (and/or any other example herein).

Example D-28 may include the subject matter of example D-27 (and/or any other example herein), wherein at least a portion of the one or more processors comprises a processor of a mobile device.

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

What is claimed is:

1. A method comprising:

forming a first digital fingerprint of a first inanimate physical object based on digital image data of at least a portion of a first inanimate physical object, wherein forming the first digital fingerprint includes selecting a first authentication region in the digital image data and extracting at least one first feature vector from the first authentication region;

storing a first database record associated with the digital fingerprint of the first inanimate physical object in a database system;

subsequent to storing the first database record, forming a second digital fingerprint based on digital image data of at least a portion of a target inanimate physical object, wherein forming the second digital fingerprint includes selecting a second authentication region in the digital image data of at least a portion of the target inanimate physical object and extracting at least one second feature vector from the second authentication region;

acquiring information corresponding to the target inanimate physical object;

determining that the target inanimate physical object matches the first physical object based on the second digital fingerprint matching the first digital fingerprint;

updating the first database record with an indication of the matching; and based on the matching, updating history data of the first database record based on the information corresponding to the target physical object.

2. The method of claim 1, further comprising:

associating data obtained from a sensor with the first physical object, said data representing a metric of the first physical object;

storing the data representing the metric in the first database record;

causing the sensor to obtain additional data representing additional metrics of the first physical object; and updating the first database record based on at least one of the additional metrics.

3. The method of claim 1, further comprising:

obtaining the information from a sensor:

associating the information with the target physical object, said information representing a metric of the target physical object; and storing the information representing the metric in the first database record as the information.

4. The method of claim 1, wherein determining that the target physical object matches the first physical object based on the second digital fingerprint matching the first digital fingerprint includes matching the second digital fingerprint with a third digital fingerprint of an intermediate aggregate physical object that includes the first physical object.

5. The method of claim 4, further comprising:
updating history data of a second database record in the database system, wherein the second database record is associated with the intermediate aggregate physical object.

6. The method of claim 1, wherein determining that the target physical object matches the first physical object based on the second digital fingerprint matching the first digital fingerprint includes matching the second digital fingerprint with a third digital fingerprint of a final aggregate physical object that includes the first physical object.

7. The method of claim 6, further comprising updating history data of a database record associated with the final aggregate physical object.

8. The method of claim 1, wherein the first digital fingerprint is based on at least one native feature of the first physical object and the second digital fingerprint is based on at least one native feature of the target physical object.

9. The method of claim 1,
wherein the at least one first feature vector includes a first array of color or gray scale numeric values corresponding to areas within the first authentication region, and
wherein the at least one second feature vector includes a second array of color or gray scale numeric values corresponding to areas within the second authentication region.

10. The method of claim 1, wherein the information includes digital information generated by at least one environmental sensor associated with the target physical object.

11. The method of claim 10, wherein the at least one environmental sensor includes at least one of: a temperature sensor, a humidity sensor, a light sensor, a pressure sensor, an oxygen level sensor, and a vibration sensor.

12. The method of claim 1, wherein the information includes digital location information about a location of the target physical object and generated by at least one global positioning system.

13. The method of claim 1, wherein the information is manually entered information about the target physical object.

14. A system comprising:
a computing server for tracking a plurality of physical objects; and
a database system operatively coupled to the computing server and arranged to store a plurality of database records, each database record of the plurality of database records having associated therewith one or more digital fingerprints and history data, wherein the one or more digital fingerprints and the history data associated with a database record are associated with a same physical object of the plurality of physical objects,
wherein the computing server is configured to:
store a first database record as one of the plurality of database records in the database system, the first database record being associated with a first digital fingerprint of a first physical object of the plurality of physical objects, wherein the first digital fingerprint is based on digital image data of at least a portion of the first physical object and is formed by selecting a first authentication region of the object in the digital image data and extracting at least one first feature vector from the first authentication region, wherein the first feature vector describes at least one feature of the first authentication region;
form a second digital fingerprint based on digital image data of at least a portion of a target physical object, wherein forming the second digital fingerprint includes selecting a second authentication region in the digital image data of at least a portion of the target physical object and extracting at least one second feature vector from the second authentication region;
acquire information corresponding to a target physical object;
determine that the target physical object matches the first physical object based on the second digital fingerprint matching the first digital fingerprint;
update the first database record with an indication of the matching; and
based on the matching, update history data of the first database record based on the information corresponding to the target physical object.

15. The system of claim 14, wherein determining that the target physical object matches the first physical object based on the second digital fingerprint matching the first digital fingerprint includes matching the second digital fingerprint with a third digital fingerprint of an intermediate aggregate physical object that includes the first physical object.

16. The system of claim 14, wherein the first database record includes a plurality of digital fingerprints associated, respectively, with a plurality of the plurality of physical objects.

17. The system of claim 14, wherein the first digital fingerprint is based on at least one native feature of the first physical object and the second digital fingerprint is based on at least one native feature of the target physical object.

18. The system of claim 14, wherein the information includes digital information generated by at least one environmental sensor associated with the target physical object.

19. The system of claim 18, wherein the at least one environmental sensor includes at least one of: a temperature sensor, a humidity sensor, a light sensor, a pressure sensor, an oxygen level sensor, and a vibration sensor.

20. The system of claim 14, wherein the information includes digital location information about a location of the target physical object and generated by at least one global positioning system.

* * * * *